US012367293B2

(12) United States Patent
Sah

(10) Patent No.: US 12,367,293 B2
(45) Date of Patent: Jul. 22, 2025

(54) HIGHLY-AVAILABLE CRYPTOGRAPHIC KEYS

(71) Applicant: Amazon Technologies, Inc., Seattle, WA (US)

(72) Inventor: Divyesh A. Sah, Edison, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 600 days.

(21) Appl. No.: 17/112,540

(22) Filed: Dec. 4, 2020

(65) Prior Publication Data

US 2022/0179972 A1 Jun. 9, 2022

(51) Int. Cl.
*G06F 21/60* (2013.01)
*G06F 21/54* (2013.01)
*G06F 21/62* (2013.01)
*G06F 21/10* (2013.01)

(52) U.S. Cl.
CPC ............ *G06F 21/602* (2013.01); *G06F 21/54* (2013.01); *G06F 21/604* (2013.01); *G06F 21/629* (2013.01); *G06F 21/107* (2023.08)

(58) Field of Classification Search
CPC ...... G06F 21/602; G06F 21/54; G06F 21/604; G06F 21/629; G06F 2221/0751
See application file for complete search history.

(56) References Cited

U.S. PATENT DOCUMENTS

| | | | | |
|---|---|---|---|---|
| 10,015,167 B1* | 7/2018 | O'Kennedy | ......... | H04L 63/061 |
| 11,934,322 B1* | 3/2024 | Miller | ..................... | G06F 9/546 |
| 2014/0230007 A1* | 8/2014 | Roth | ..................... | G06F 21/602 |
| | | | | 726/1 |
| 2015/0143115 A1* | 5/2015 | Gupta | ................. | H04L 63/0428 |
| | | | | 713/168 |
| 2017/0262638 A1* | 9/2017 | Horowitz | .............. | H04L 9/0819 |
| 2017/0371708 A1 | 12/2017 | Pai | | |
| 2018/0159684 A1* | 6/2018 | Roth | ....................... | H04L 9/088 |
| 2019/0362081 A1* | 11/2019 | Kanno | ................. | G06F 21/602 |
| 2020/0099519 A1* | 3/2020 | Kol | ....................... | H04L 9/0894 |

OTHER PUBLICATIONS

International Search Report and Written Opinion mailed Mar. 24, 2022, International Patent Application No. PCT/US2021/061459, filed Dec. 1, 2021.
Rubin, "How to Use the New AWS Encryption SDK to Simplify Data Encryption and Improve Application Availability," AWS Security Blog, Mar. 22, 2016m retrieved Feb. 2, 2022 from the internet <URL:https://aws.amazon.com/blogs/security/how-to-use-the-new-aws-encryption-sdk-to-simplify-data-encryption-and-improve-application-availability/>, 7 pages.
Anonymous, "AWS Key Management Service—Developer Guide—Multiple Region Keys," Jun. 8, 2021, retrieved from the internet on Feb. 4, 2022 URL:https://docs.aws.amazon.com/kms/latest/developerguide/kms-dg.pdf, 220 pages.

* cited by examiner

*Primary Examiner* — Meng Li
(74) *Attorney, Agent, or Firm* — Davis Wright Tremaine LLP

(57) ABSTRACT

Systems and methods for providing encrypted cryptographic keys. A system obtains a request to generate a data key. The system generates the data key and a data structure comprising the data key encrypted with keys from a set of compute regions. The system provides the data structure and the data key in response to the request. The data structure can be used to obtain the data key contingent on at least one compute region of the set of compute regions being available.

20 Claims, 9 Drawing Sheets

HIGHLY-AVAILABLE CRYPTOGRAPHIC KEYS

BACKGROUND

Customers may use computing resource service providers for various purposes, such as to perform cryptographic operations to protect data. The customer may utilize a data key to encrypt data and, in turn, use a cryptography service of a computing resource service provider to encrypt the data key using a managed key using envelope encryption techniques. Within a computing resource service provider, there may exist several compute regions that support cryptography service instances that operate independently of each other and have respective region-specific managed keys. However, performing cryptographic operations across multiple geographical regions can be challenging, as the cryptographic keys used in the cryptographic operations can sometimes only be usable in a particular compute regions.

BRIEF DESCRIPTION OF THE DRAWINGS

Various techniques will be described with reference to the drawings, in which.

DETAILED DESCRIPTION

Figure 1:
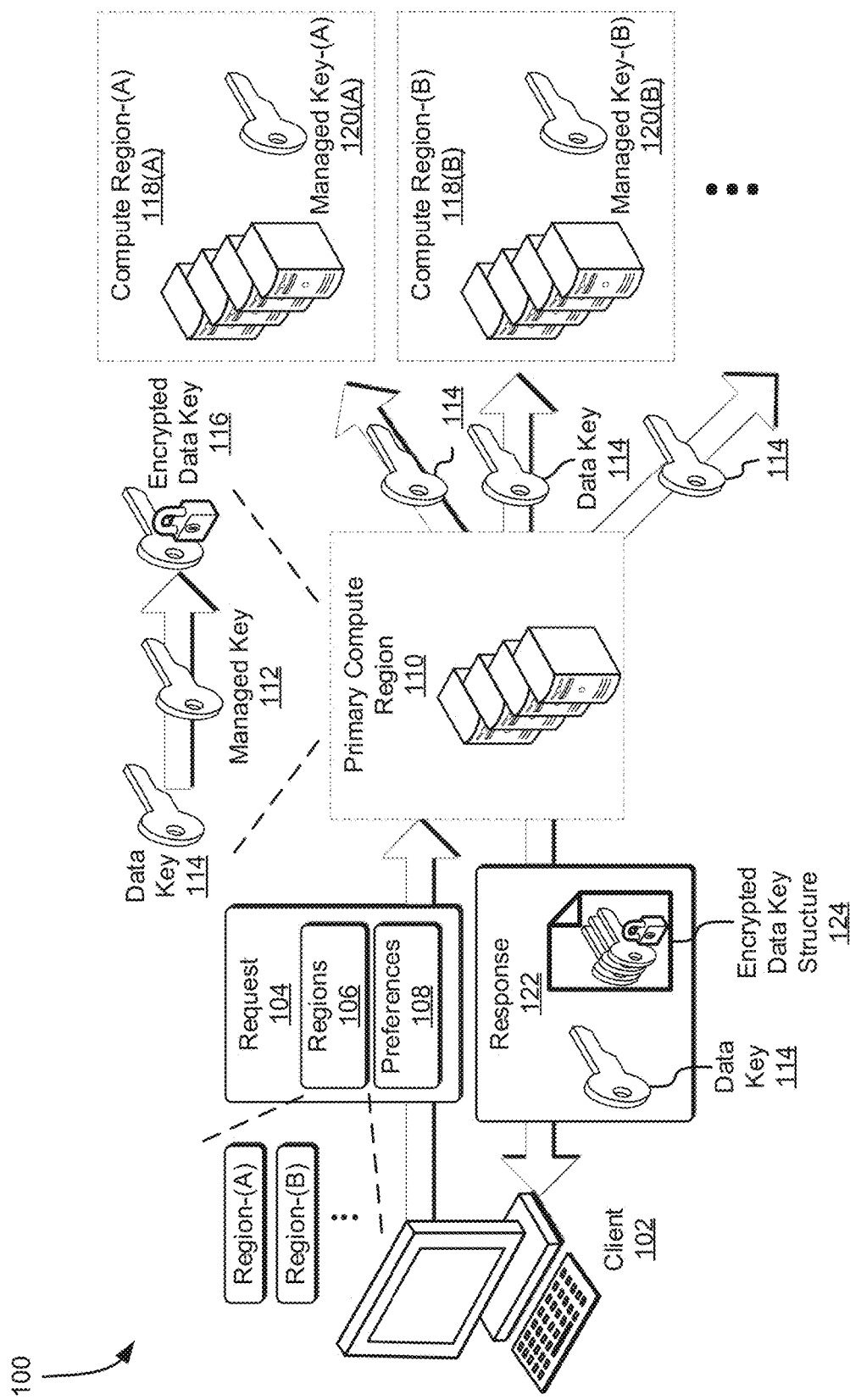
FIG. 1 shows an illustrative example of a computing environment in which a client obtains an encrypted data key structure.

Techniques described herein include systems and methods to provide cryptographic keys that can be utilized across multiple regions. In various embodiments, a computing resource service provider operates a cryptography service (which can be referred to as a key management service or "KMS") that manages cryptographic keys and performs cryptographic operations using the cryptographic keys on behalf of clients of the computing resource service provider. A client can submit various requests to a computing resource service provider for operations to be performed by the computing resource service provider. A cryptography service can provide a web service interface to which requests can be submitted by clients to cause cryptographic operations using cryptographic keys to be performed.

A computing resource service provider can provide a cryptography service in multiple compute regions. A compute region can refer to a grouping of resources provided by a computing resource service provider and can correspond to a geographic location or region. A cryptography service, in an embodiment, is implemented in multiple compute regions such that each compute region has an instance of the cryptography service that is independent from other instances (e.g., implemented and/or using separate hardware such that a failure such as a power outage that affects one compute region does not affect availability of a cryptography service instance of another compute region). Compute regions can include region-specific cryptographic keys which can be utilized by cryptography service instances of the compute regions to perform cryptographic operations. For example, a cryptographic operation performed by a cryptography service instance of a region uses a region-specific cryptographic key, and a different cryptographic operation performed by a different cryptography service instance of a different region uses a different region-specific cryptographic key. A cryptography service instance can, in response to a request from a client, provide the client with a highly-available encrypted data key structure that can be decrypted in multiple regions.

In at least one example, a highly-available encrypted data key structure is created by a client submitting a request to the cryptography service instance to create a data key, which may be used by the client to encrypt various data objects using envelope encryption techniques. A data key may also be referred to as a "data encryption key" and may refer to a suitable cryptographic key that is used by a client to encrypt data. In response to the request to create a data key, the client may receive a response that includes both a plaintext data key and a highly-available encrypted data key structure that can be decrypted by multiple cryptography service instances in multiple compute regions. The client can be associated with cryptographic keys, referred to as managed keys, in the primary compute region and the multiple compute regions (the managed keys can be maintained on behalf of the client by cryptography service instances in the primary compute region and the multiple compute regions). A "managed key" may also be referred to as a "key encryption key" that is used to encrypt a data encryption key. A request to create a highly-available encrypted data key structure may include a list of compute regions that are to be supported and preference information that can be used to determine how subsequent cryptography requests using the highly-available encrypted data key structure should be routed, such as when multiple compute regions from the list are simultaneously available. In response to the request, the cryptography service instance can first generate the data key, and then encrypt the data key using managed keys from the primary compute region, as well as from each compute region of the multiple compute regions that the client specified in the request. In some cases, the cryptography service instance submits encryption requests comprising the data key to cryptography service instances in each of the compute regions listed in the request, and obtains, in response to the requests, encrypted data keys that are encrypted using region-specific managed keys (e.g., each encrypted data key of the encrypted data keys is encrypted by a particular cryptography service instance of a particular compute region using a region-specific managed key from the particular compute region). In various cases, an encrypted data key that was encrypted using the managed key of a first region cannot be decrypted by a second region because the region-specific managed key of the first region is different from the region-specific managed key of the second region. The cryptography service instance can associate each encrypted data key of the encrypted data keys with an identifier of a corresponding compute region and generate the highly-available encrypted data key structure comprising the encrypted data keys associated with corresponding compute regions and preference information. The highly-available encrypted data key structure can be an opaque data structure such that the encrypted data keys associated with corresponding compute regions and preference information of the highly-available encrypted data key structure are not readable by the client. The cryptography service instance can then provide the highly-available encrypted data key structure and the data key to the client in response to the request.

A client can use a highly-available encrypted data key structure to perform cryptography operations, contingent upon at least one of the compute regions specified during creation of the highly-available encrypted data key structure being available. Various events can cause a compute region to become unavailable or otherwise inaccessible to other computer systems, such as power outages, natural disasters, planned outages (e.g., relating to hardware and/or software upgrades to data center servers), etc. When a client submits a request (e.g., encryption or decryption request) with a highly-available encrypted data key structure, an endpoint routing service can obtain the request and inspect the highly-available encrypted data key structure. The endpoint routing service can analyze preference information and indicated compute regions of the highly-available encrypted data key structure. The endpoint routing service can monitor statuses of the indicated compute regions (e.g., determine which compute regions of the indicated compute regions are available and accessible) and, based at least in part on the preference information, determine an available compute region of the indicated compute regions to route the request to. For example, the preference information indicates an order of compute regions, in which the endpoint routing service selects a highest ordered compute region of the order of compute regions available. The endpoint routing service can then route the request to a cryptography service instance of the available compute region. In some examples, the endpoint routing service only routes portions of the highly-available encrypted data key structure corresponding to the available compute region to the cryptography service instance of the available compute region, such as an encrypted data key of the highly-available encrypted data key structure that corresponds to the available compute region (e.g., an encrypted data key that was encrypted with a managed key from the available compute region). The cryptography service instance can decrypt the encrypted data key using a managed key specific to the available compute region and provide the decrypted key to the client.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

As one skilled in the art will appreciate in light of this disclosure, certain embodiments can be capable of achieving certain advantages, including some or all of the following: improving the functionality of a computing system by providing an ability to generate an encrypted cryptographic key that can be decrypted across multiple compute regions; and improving the reliability of an encrypted cryptographic key by providing an ability to decrypt the encrypted cryptographic key when one or more compute regions are unavailable, as well as various other advantages.

FIG. 1 shows an illustrative example of a computing environment 100 in which a client obtains an encrypted data key structure. The computing environment 100 includes a client 102, which can submit a request 104 comprising regions 106 data and preferences 108 data to a primary compute region 110. A cryptography service instance of a primary compute region 110 can generate a data key 114 and encrypt the data key 114 with a managed key 112 to generate an encrypted data key 116. A cryptography service instance can cause a data key 114 to be encrypted in a compute region-(A) 118(A) using a managed key-(A) 120(A), in a compute region-(B) 118(B) using a managed key-(B) 120 (B), as well as various other compute regions. A cryptography service instance can provide a response 122 comprising a data key 114, and an encrypted data key structure 124 comprising encrypted data keys. A client 102 can obtain a response 122 and utilize an encrypted data key structure 124 in one or more cryptographic operations.

In an embodiment, a cryptography service is a collection of computing resources collectively configured to manage and use cryptographic keys for clients of a computing resource service provider. Cryptographic keys used by a cryptography service can have associated identifiers that clients can reference when submitting requests to perform cryptographic operations (such as encryption, decryption, and message signing) and/or other operations, such as key rotation. A cryptography service can securely maintain cryptographic keys in hardware security modules to avoid access by unauthorized parties. A cryptography service can provide encryption keys, such as a data key (DK), which can be encrypted using a managed key (MK), contained within the cryptography service. An encryption key can be a type of cryptographic key, which, in an embodiment, is a key suitable for use in a cryptographic algorithm (e.g., encryption algorithm, decryption algorithm, digital signature algorithm) that cryptographically protects an aspect of data, such as by providing cryptographically verifiable assurances of confidentiality, integrity, and/or authenticity of the data.

Managed keys can be cryptographic keys that are maintained by a cryptography service on behalf of one or more clients, and never exported from the cryptography service in plaintext form. Each managed key may be bound to a specific client, and can only be used by that specific client or with an indication that use of the managed key is authorized by the client, such as in cases where the client delegates authority to use the managed key to another computing entity. Managed keys can be symmetric cryptographic keys or asymmetric cryptographic keys—for asymmetric cryptographic keys, the managed key may refer specifically to the private key of an asymmetric key pair. In some embodiments, managed keys are asymmetric cryptographic keys, in which a particular managed key comprises a private portion and a public portion where the public portion is used for some cryptographic operations (such as encryption and verifying digital signatures) and the private portion is used for other cryptographic operations (such as decryption and generating digital signatures); the private portion can be maintained by a cryptography service and designed to never be exported from the cryptography service in plaintext form. In various embodiments, a cryptographic key is referred to as a key, cryptography key, cryptographic operation key, cryptographic secret, cryptographic material, and/or variations thereof. In some embodiments, a managed key is a cryptographic key associated with a particular client of a computing resource service provider and is used to perform various cryptographic operations such as encryption and decryption. A data key can be generated and used to encrypt data; the data key can be encrypted by a managed key and the plaintext data key can be discarded or otherwise deleted. The encrypted data can be decrypted by first decrypting the data key with the managed key, and then using the decrypted data key to decrypt the encrypted data.

A cryptography service can be implemented in multiple compute regions such as primary compute region 110, compute region-(A) 118(A), and compute region-(B) 118(B) wherein each compute region can have an instance of the cryptography service that is independent from other instances. A compute region can refer to a grouping of resources provided by a computing resource service provider and can correspond to a geographic location or region. In various embodiments, a compute region is a logical grouping of one or more hardware and/or software computing resources provided by a computing resource service provider. A compute region may correspond to a geographic location or region where one or more hardware and/or software computing resources may be located and/or implemented. In some examples, a compute region refers to a collection of availability zones mapped to physical data centers of the compute region. Clients can communicate to a cryptography service instance via application programming interface (API) requests, which can be web service API requests. API requests to a cryptography service instance can indicate a compute region of the cryptography service instance. Clients can access a cryptography service instance through one or more networks, such as the Internet. Clients can utilize cryptographically protected communications sessions to communicate to a cryptography service instance. Clients can submit appropriately configured API requests to a cryptography service instance through one or more web service interfaces. An API request can be considered to be appropriately configured if it is formatted sufficiently and contains information (e.g., authentication information such as a digital signature or other credential or information generated from a credential) sufficient to cause a receiving system (e.g., cryptography service instance) to fulfill the request. Generally, it should be understood that unless explicitly contradicted or otherwise clear from context, the movement of data, and interactions, from one system to another can be performed in any suitable manner, such as in a single transmission, by streaming (e.g., by transmitting the data in pieces over multiple transmissions), or otherwise.

In at least one embodiment, a cryptography service instance is used to process and fulfill web service API requests related to cryptographic operations. An API request can be referred to as a request, API call, remote procedure call (RPC), and/or variations thereof. For example, a cryptography service instance supports one or more of the following APIs:

CreateKey(KeyID)
Encrypt(KeyID, Data, Encryption Configuration)
Decrypt(KeyID, Ciphertext Data, Encryption Configuration)
GenerateDataKey(KeyID, Regions, Preferences, Configuration Information)

A CreateKey(KeyID) request, in an embodiment, causes a cryptography service instance to create a key identified by the KeyID identified in the request. Alternative embodiments can designate the name of the request performing the CreateKey(KeyID) functionality as create(KeyID), key (KeyID), and/or variations thereof. Inputs to a KeyID parameter can include one or more data objects, such as a string, that indicate or otherwise identify one or more cryptographic keys. Upon receipt of a request, a cryptography service instance can generate a key and associate the key with the KeyID. It should be known that KeyIDs can be, but are not necessarily, unique identifiers. For instance, a KeyID can identify a family of keys. It should be noted that, when a KeyID does not uniquely identify a key, various systems can be in place to enable proper functionality. For example, in various embodiments, a family of keys identified by a KeyID is finite. If a decryption operation using a key identified by a KeyID is requested, additional data (e.g., a time stamp of when the encryption was performed) can enable determining the proper key to use. In some embodiments, ciphertexts include information indicating a key version. In some embodiments, all possible keys are used to provide different decryptions of the data. Since there are a finite number of keys, the proper decryption can be selected from those provided. In some embodiments, decryption with a key is performed in a manner that enables a cryptography service instance to detect that the ciphertext was not generated based at least in part on the key, such as by using authenticated encryption. Other variations are also considered as being within the scope of the present disclosure.

An Encrypt(KeyID, Data, Encryption Configuration) request can be used to cause a cryptography service instance to encrypt specified data using a key identified by the KeyID, which can refer to an identifier that uniquely resolves to a particular managed key. Inputs to a KeyID parameter can include one or more data objects, such as strings, that indicate or otherwise identify one or more cryptographic keys. A Data parameter can be used to specify data that is to be encrypted. Inputs to a Data parameter can include one or more data objects comprising data to be encrypted. A Data parameter can be used to specify plaintext that is to be encrypted. An Encryption Configuration parameter can be used to specify an encryption algorithm or encryption context to use to encrypt data. Inputs to an Encryption Configuration parameter can include one or more data objects, such as strings, that indicate or otherwise comprise encryption information to utilize to encrypt data. An Encryption Configuration parameter can be used to specify Additional Authenticated Data (AAD), which can be used for various purposes and can be data that is not necessarily encrypted, but that is authenticated, e.g., by an electronic signature, a message authentication code or, generally, a keyed hash value included with the AAD. In some embodiments, ciphertext is generated including at least a portion of AAD. In some embodiments, AAD is provided separately during decryption. In some embodiments, AAD is generated at decryption time based at least in part on a request and or other metadata such that decryption will only succeed when the metadata passes. An access control policy (referred to simply as "policy") can constrain whether a cryptographic operation can be performed with respect to particular AAD. Processing of Encrypt requests can require, by programming logic and/or policy enforced by a cryptography service instance, both that an AAD contain particular values and that the AAD be authentic (e.g., not modified since original transmission).

In some embodiments, an Encryption Configuration parameter is used to specify an encryption algorithm to use to encrypt data. An encryption algorithm can only be specified if a cryptographic key indicated by a KeyID parameter is an asymmetric cryptographic key. In some embodiments, an Encryption Configuration parameter is used to specify an encryption context. An encryption context can be information that can be utilized to encrypt data. An encryption context can specify data such as AAD as described above. An encryption context can only be specified if a cryptographic key indicated by a KeyID parameter is a symmetric cryptographic key. Upon receipt of an Encrypt request, a cryptography service instance can encrypt data specified by a Data parameter using one or more cryptographic keys indicated by a KeyID parameter using encryption context or encryption algorithm information indicated by an Encryption Configuration parameter. In some examples, a KeyID parameter indicates a managed key that is a symmetric cryptographic key, in which encryption is performed using the managed key. In some embodiments, a KeyID parameter indicates a managed key that is an asymmetric cryptographic key, in which encryption is performed using a public portion of the managed key.

A Decrypt(KeyID, Ciphertext Data, Encryption Configuration) can be used to cause a cryptography service instance to decrypt specified ciphertext data using a key identified by the KeyID, which can refer to an identifier that uniquely resolves to a particular managed key. Inputs to a KeyID parameter can include one or more data objects, such as strings, that indicate or otherwise identify one or more cryptographic keys. A Ciphertext Data parameter can be used to specify ciphertext to be decrypted. In some examples, inputs to a Ciphertext Data parameter include data objects comprising ciphertext. Inputs to a Ciphertext parameter can include an encrypted data key structure, such as those described in connection with FIG. 2. An Encryption Configuration parameter can be used to specify an encryption algorithm or encryption context to use to decrypt data. Inputs to an Encryption Configuration parameter can include one or more data objects, such as strings, that indicate or otherwise comprise encryption information to utilize to decrypt data. An Encryption Configuration parameter can be used to specify AAD as described above. In some embodiments, an Encryption Configuration parameter is used to specify an encryption algorithm to use to decrypt data. An encryption algorithm can only be specified if a cryptographic key indicated by a KeyID parameter is an asymmetric cryptographic key. In some embodiments, an Encryption Configuration parameter is used to specify an encryption context. An encryption context can be information that can be utilized to decrypt data. An encryption context can specify data such as AAD as described above. An encryption context can only be specified if a cryptographic key indicated by a KeyID parameter is a symmetric cryptographic key.

A KeyID parameter can be used to specify one or more keys (e.g., managed keys) of one or more cryptography service instances of one or more compute regions to use to decrypt specified ciphertext data. A Decrypt request can be submitted to a cryptography service instance or an endpoint routing service. In some examples, a Decrypt request is obtained by a cryptography service instance, in which the cryptography service instance decrypts ciphertext indicated by a Ciphertext Data parameter using one or more keys indicated by a KeyID parameter and encryption information indicated by an Encryption Configuration parameter. In some examples, a Decrypt request is obtained by an endpoint routing service and routed to an appropriate cryptography service instance based on preference information included in an encrypted data key structure.

Upon receipt of a Decrypt request indicating an encrypted data key structure, an endpoint routing service can analyze the encrypted data key structure to determine an available compute region based at least in part on preferences and regions indicated by the encrypted data key structure; the endpoint routing service can then route the Decrypt request to a cryptography service instance of the available compute region, in which the cryptography service instance can decrypt an encrypted key corresponding to the available compute region of the encrypted data key structure using a managed key specific to the cryptography service instance of the available compute region that is identified by a KeyID parameter. The cryptography service instance can provide the decrypted key in response to the Decrypt request. In some examples, an endpoint routing service routes portions of a Decrypt request to a cryptography service instance of an available compute region, such as an encrypted data key of the Decrypt request that was encrypted with a managed key of the cryptography service instance of the available compute region. In some examples, a KeyID parameter indicates a managed key that is a symmetric cryptographic key, in which decryption is performed using the managed key. In some embodiments, a KeyID parameter indicates a managed key that is an asymmetric cryptographic key, in which decryption is performed using a private portion of the managed key.

A GenerateDataKey(KeyID, Regions, Preferences, Configuration Information) request can be used to cause a cryptography service instance to generate an encrypted data key. A KeyID parameter can be used to identify one or more keys (e.g., managed keys) to use to encrypt a generated data key. Inputs to a KeyID parameter can include a list or other data object indicating one or more managed keys in one or more compute regions. In some examples, inputs to a KeyID parameter include identifiers of one or more managed keys that identify compute regions of the one or more managed keys. A Regions parameter can be used to specify a list of compute regions of one or more managed keys. Inputs to a Regions parameter can include a data object (e.g., regions 106) indicating one or more compute regions where one or more managed keys are from. A Preferences parameter can be used to specify preferences that can determine which compute region of one or more compute regions to access for cryptographic operations. Preferences can indicate an order of compute regions or other logic to determine a compute region of one or more compute regions. Inputs to a Preferences parameter can include a data object (e.g., preferences 108) that indicates preferences. A Configuration Information parameter can be used to specify other data associated with generating a data key. A Configuration Information can specify an encryption context, such as described above. A Configuration Information can specify a length and/or size of a data key to be generated. Inputs to a Configuration Information parameter can include one or more data objects that indicate an encryption context, length/size of a data key to be generated, and the like.

In some embodiments, a KeyID parameter of a GenerateDataKey request identifies one or more managed keys that exist in one or more compute regions. In some embodiments, a KeyID parameter of a GenerateDataKey request comprises identifiers of one or more managed keys to be created (e.g., keys that do not exist prior to the submission of the GenerateDataKey request), and a Regions parameter indicates compute regions of cryptography service instances in which the one or more managed keys are to be created. For example, upon receipt of a GenerateDataKey request, a cryptography service instance causes cryptography service instances of compute regions identified by a Regions parameter of the GenerateDataKey request to create managed keys, and associate the created managed keys with a client that submitted the GenerateDataKey request; the managed keys can be identified by identifiers of a KeyID parameter of the GenerateDataKey request.

Upon receipt of a GenerateDataKey request, a cryptography service instance can generate a data key (e.g., through one or more key derivation functions). The cryptography service instance can encrypt the data key using a managed key of the cryptography service instance which can be identified in a KeyID parameter of the GenerateDataKey request. The cryptography service instance can submit requests to encrypt the data key to cryptography service instances of compute regions which can be identified in a Regions parameter of the GenerateDataKey request using managed keys which can be identified in the KeyID parameter of the GenerateDataKey request. The cryptography service instance can obtain a set of encrypted data keys that comprises the data key encrypted by the cryptography service instance, as well as the data key encrypted by the cryptography service instances of the compute regions. The cryptography service instance can generate an encrypted data key structure that comprises at least the set of encrypted data keys associated with the compute regions, and preferences which can be indicated in the GenerateDataKey request. The cryptography service instance can provide the data key and the encrypted data key structure in response to the GenerateDataKey request. An encrypted data key structure can comprise an encrypted data keys and regions data structure that comprises encrypted data keys associated with compute regions, and a preferences data structure that indicates preferences for selecting a compute region.

A GenerateDataKey request can be utilized with fewer or more parameters than described above. In some embodiments, a GenerateDataKey request comprises a parameter that indicates whether a data key to be generated is to be a highly-available data key. A highly-available data key can be referred to as a cross-region data key, multi-region data key, and the like. High availability may refer to computing resources being available across multiple compute regions, such that if one compute region becomes inoperable or unavailable, other compute regions can be utilized instead. A GenerateDataKey request that indicates that a data key to be generated is to be a highly-available data key, which can be referred to as a request to generate a highly-available data key, can require parameters KeyID, Regions, Preferences, Configuration Information as described above. A GenerateDataKey request that indicates that a data key to be generated is not to be a highly-available data key can, in some examples, not require all of parameters KeyID, Regions, Preferences, Configuration Information as described above. For example, a GenerateDataKey request that indicates that a data key to be generated is not to be a highly-available data key comprises at least a KeyID parameter, in which, upon receipt of the request, a cryptography service instance generates a data key and encrypts the generated data key using a key specified by the KeyID, and returns the plaintext data key and the corresponding ciphertext copy of the data key, encrypted by the key identified by the KeyID.

A cryptography service instance can support a request to update a data key. A request to update a data key can be utilized to update one or more preferences, compute regions, and the like of an encrypted data key structure. A request to update a data key can comprise parameters such as a KeyID parameter, an updated preferences parameter, an updated compute regions parameter, and an encrypted data key structure parameter. A KeyID parameter can be used to identify one or more keys to use to encrypt a generated data key. Inputs to a KeyID parameter can include a list or other data object indicating one or more managed keys in one or more compute regions. An updated preferences parameter can be used to indicate an updated set of preferences for determining a compute region of one or more compute regions to access for cryptographic operations. Inputs to an updated preferences parameter include a data object that indicates preferences. In some examples, an updated set of preferences is the same as preferences indicated in an encrypted data key structure to be updated. An updated compute regions parameter can be used to indicate a list of compute regions of one or more managed keys. Inputs to an updated compute regions parameter can include a data object indicating one or more compute regions where one or more managed keys are from. In some examples, an updated compute regions parameter can indicate the same compute regions as compute regions indicated in an encrypted data key structure to be updated. An encrypted data key structure parameter can be utilized to input an encrypted data key structure.

Upon receipt of a request to update a data key, a cryptography service instance can obtain an encrypted data key structure of the request and update encrypted data keys and regions, and preferences of the encrypted data key structure based at least in part on a KeyID parameter, an updated preferences parameter, and an updated compute regions parameter of the request to determine an updated data structure (e.g., an updated encrypted data key structure) comprising updated encrypted data keys and regions and updated preferences, and provide the updated data structure in response to the request. A cryptography service instance can update preferences of an encrypted data key structure by replacing the preferences of the encrypted data key structure with preferences indicated by an updated preferences parameter. A cryptography service instance can update preferences of an encrypted data key structure by adding preferences indicated by an updated preferences parameter to the preferences of the encrypted data key structure (e.g., by storing the preferences indicated by the updated preferences parameter along with the existing preferences of the encrypted data key structure).

A cryptography service instance can update encrypted data keys and regions of an encrypted data key structure by adding data keys encrypted with managed keys from compute regions indicated by a KeyID parameter and an updated compute regions parameter to the encrypted data keys and regions of the encrypted data key structure; the cryptography service instance can decrypt an encrypted data key of the encrypted data keys and regions of the encrypted data key structure, encrypt the data key with managed keys from the compute regions indicated by the KeyID parameter and the updated compute regions parameter (e.g., by submitting Encrypt requests to cryptography service instances of the compute regions) to obtain a set of updated encrypted data keys, and add the set of updated encrypted data keys to the encrypted data keys and regions of the encrypted data key structure.

A cryptography service instance can update encrypted data keys and regions of an encrypted data key structure by replacing encrypted data keys of the encrypted data key structure with data keys encrypted with managed keys from compute regions indicated by a KeyID parameter and an updated compute regions parameter; the cryptography service instance can decrypt an encrypted data key of the encrypted data keys and regions of the encrypted data key structure, encrypt the data key with managed keys from the compute regions indicated by the KeyID parameter and the updated compute regions parameter (e.g., by submitting Encrypt requests to cryptography service instances of the compute regions) to obtain a set of updated encrypted data keys, and replace encrypted data keys of the encrypted data keys and regions of the encrypted data key structure with the set of updated encrypted data keys.

A client 102 may refer to a suitable computing device that can access one or more services provided by a computing resource service provider, such as a computer, mobile device, server, and the like. In an embodiment, a client (e.g., client 102) refers to a computer system with memory storing executable instructions that, when executed by one or more processors of the computer system, is used to establish a client-server relationship with a computing resource service provider through one or more networks. A client 102 can access and utilize a cryptography service provided by a computing resource service provider, which can be hosted and/or implemented in multiple compute regions (e.g., there can be multiple cryptography service instances in the multiple compute regions). In an embodiment, a cryptography service instance refers to a collection of computing resources that provides or otherwise implements cryptography services. A cryptography service instance can perform cryptographic operations (e.g., encryption, decryption, cryptographic key generation, and the like) using one or more software and/or hardware computing resources of a compute region associated with the cryptography service instance. Cryptography service instances can be implemented in various compute regions as described in greater detail below.

A client 102 can submit a request 104 to a cryptography service instance of a primary compute region 110. A request 104 can be a GenerateDataKey request as described above. A request 104 can be a request to generate a highly-available data key. In some examples, a request 104 comprises identifiers of managed keys that exist in one or more compute regions. In some examples, a request 104 comprises identifiers of managed keys to be created in one or more compute regions, in which, upon receipt of the request 104 by a cryptography service instance of a primary compute region 110, the cryptography service instance submits requests to cryptography service instances of the one or more compute regions to create the managed keys.

A request 104 can comprise regions 106, preferences 108, as well as other various data. Regions 106 can be a data object such as a list or array that can indicate one or more compute regions. Regions 106 can indicate one or more compute regions in which a client has associated managed keys in. Regions 106 can indicate one or more compute regions in which encrypted keys of an encrypted data key structure obtained in response to a request 104 can be decrypted in. Referring to FIG. 1, regions 106 can indicate a Region-(A) corresponding to a Compute Region-(A) 118(A), a Region-(B) corresponding to a Compute Region-(B) 118(B) as well as other regions not depicted in FIG. 1. Preferences 108 can be a data object that can indicate one or more preferences that can determine how to select a compute region of one or more compute regions. Preferences can be referred to as compute region preferences, region preferences, and/or variations thereof. Preferences 108 can indicate an order of one or more compute regions in which compute regions are to be selected in the order indicated.

Preferences 108 can indicate criteria for selecting one or more compute regions, such as geographical requirements, latency requirements, or security requirements. Geographical requirements can be based on proximity requirements, in which compute regions are to be selected based on proximity (e.g., a closest compute region is selected first, a farthest compute region is selected first, or the like). Latency requirements can be based on network latency requirements, in which compute regions are to be selected based on network latency (e.g., a compute region with a lowest network latency is selected first, a compute region with a highest network latency is selected first, or the like). Security requirements can be based on various legal and/or security requirements, in which compute regions are to be selected based on legal and/or security characteristics (e.g., a compute region with specific legal and/or security characteristics is selected first, or the like).

A request 104 can comprise data that can indicate configuration information (e.g., a Configuration Information parameter) regarding a data key that is to be created. Configuration information can comprise information indicating an encrypted context to use to encrypt a data key, a length of a data key to be generated, a size of a data key to be generated, and the like. A request 104 can be obtained by a cryptography service instance of a primary compute region 110. A cryptography service instance can obtain a request 104 through one or more interfaces, such as a web service interface. A request 104 can be a web service API request.

In an embodiment, a compute region, such primary compute region 110, compute region-(A) 118(A), and compute region-(B) 118(B) as illustrated in FIG. 1, refers to a logical and/or physical partitioning of resources provided by a computing resource service provider that hosts a variety of services, such as a cryptography service, and provides a variety of resources in multiple locations (e.g., physical and/or geographic locations). A compute region can be referred to as a region, computing region, and the like. A computing resource service provider can host or otherwise implement a cryptography service in multiple compute regions. A cryptography service, in an embodiment, is implemented in multiple compute regions such as primary compute region 110, compute region-(A) 118(A), and compute region-(B) 118(B) wherein each compute region has an instance of the cryptography service that is independent from other instances (e.g., implemented and/or using separate hardware such that a failure such as a power outage that affects one compute regions does not affect availability of a cryptography service instance of another compute region). In an embodiment, a compute region is identified by a collection of datacenters in one or more geographical regions (e.g., "Western Europe"). A compute region can be available, which can refer to a state of the compute region in which one or more services of the compute region are accessible. A compute region can be unavailable, which can refer to a state of the compute region in which one or more services of the compute region are inaccessible. A compute region can be unavailable as a result of various events, such as power outages, network connectivity outages, and the like.

A client 102 can be associated with managed keys in at least a primary compute region 110, a compute region-(A) 118(A), and a compute region-(B) 118(B). In some embodiments, a client 102 submits requests (e.g., CreateKey requests) to cryptography service instances of a primary compute region 110, a compute region-(A) 118(A), and a compute region-(B) 118(B) to create managed keys (e.g., managed key 112, managed key-(A) 120(A), and managed key-(B) 120(B)) associated with the client 102 in the primary compute region 110, the compute region-(A) 118(A), and the compute region-(B) 118(B). In some embodiments, a client 102 submits a request (e.g., a GenerateDataKey request) to a cryptography service instance which causes cryptography service instances of a primary compute region 110, a compute region-(A) 118(A), and a compute region-(B) 118(B) to create managed keys (e.g., managed key 112, managed key-(A) 120(A), and managed key-(B) 120(B)) associated with the client 102 in the primary compute region 110, the compute region-(A) 118(A), and the compute region-(B) 118(B).

A client 102 can be associated with a managed key 112 of a primary compute region 110, a managed key-(A) 120(A)

of a compute region-(A) 118(A), a managed key-(B) 120(B) of a compute region-(B), as well as others not depicted in FIG. 1. A cryptography service instance of a primary compute region 110 can obtain a request 104 and generate a data key 114. A data key 114 can be generated based on information indicated in a request 104. A data key 114 can be a cryptographic key that can be generated by a cryptography service instance through one or more key derivation functions, or may be generated by client 102, in some cases. A cryptography service instance of a primary compute region 110 can encrypt a data key 114 with a managed key 112 to generate an encrypted data key 116. In some embodiments, a managed key 112 is an asymmetric cryptographic key, in which a data key 114 can be encrypted with a public portion of the managed key 112. In some examples, a managed key 112 is created in response to a request 104. In some examples, a managed key 112 is created in response to a request such as a CreateKey request.

A cryptography service instance of a primary compute region 110 can submit cryptographic requests to cryptography service instances of compute regions identified in a request 104 to encrypt a data key 114. The requests can be Encrypt requests as described above. Referring to FIG. 1, a cryptography service instance of a primary compute region 110 can submit requests to a cryptography service instance of a compute region-(A) 118(A), a cryptography service instance of compute region-(B) 118(B), as well as others not depicted in FIG. 1, to encrypt a data key 114. The requests can comprise the data key 114. A cryptography service instance of a compute region-(A) 118(A) can obtain a data key 114. In some embodiments, a cryptography service instance of a compute region-(A) 118(A) obtains a data key 114 from a request from a cryptography service instance of a primary compute region 110 that comprises the data key 114. A cryptography service instance of a compute region-(A) 118(A) can encrypt a data key 114 using a managed key-(A) 120(A) and provide the encrypted data key to a cryptography service instance of a primary compute region 110. In some embodiments, a managed key 120 (A) is an asymmetric cryptographic key, in which a data key 114 can be encrypted with a public portion of the managed key 120-(A). In some examples, a managed key-(A) 120(A) is created in response to a request, such as a CreateKey request. In various embodiments, a cryptography service instance of a primary compute region 110 causes a cryptography service instance of a compute region-(A) 118(A) to create a managed key-(A) 120(A) as a result of the cryptography service instance of the primary compute region 110 obtaining a request 104.

A cryptography service instance of a compute region-(B) 118(B) can obtain a data key 114. In some embodiments, a cryptography service instance of a compute region-(B) 118 (B) obtains a data key 114 from a request from a cryptography service instance of a primary compute region 110 that comprises the data key 114. A cryptography service instance of a compute region-(B) 118(B) can encrypt a data key 114 using a managed key-(B) 120(B) and provide the encrypted data key to a cryptography service instance of a primary compute region 110. In some embodiments, a managed key 120-(B) is an asymmetric cryptographic key, in which a data key 114 can be encrypted with a public portion of the managed key 120-(B). In some examples, a managed key-(B) 120(B) is created in response to a request, such as a CreateKey request.

In various embodiments, a cryptography service instance of a primary compute region 110 causes a cryptography service instance of a compute region-(B) 118(B) to create a managed key-(B) 120(B) as a result of the cryptography service instance of the primary compute region 110 obtaining a request 104. Cryptography service instances of compute regions not depicted in FIG. 1, which can be specified in regions 106, can obtain a data key 114, encrypt the data key 114 with managed keys corresponding to the compute regions, and provide the encrypted keys to a cryptography service instance of a primary compute region 110.

A cryptography service instance of a primary compute region 110 can obtain a set of encrypted data keys, which can comprise a data key 114 encrypted with a managed key 112 from the cryptography service instance of the primary compute region 110, as well as the data key 114 encrypted with managed keys of cryptography service instances of other compute regions (e.g., managed key-(A) 120(A) of compute region-(A) 118(A), managed key-(B) 120(B) compute region-(B) 118(B), and others). A cryptography service instance of a primary compute region 110 can generate an encrypted data key structure 124 that comprises a set of encrypted data keys associated with compute regions (e.g., compute regions identified in regions 106) and preferences for selecting a compute region of the compute regions (e.g., preferences specified in preferences 108). In some embodiments, an encrypted data key structure 124 comprises a set of encrypted data keys associated with compute regions of cryptography service instances that encrypted the set of encrypted data keys, in which the compute regions are indicated in regions 106 of a request 104, and preferences specified in preferences 108 of the request 104.

A cryptography service instance of a primary compute region 110 can generate a response 122. In an embodiment, a response 122 is a response to a request 104. A response 122 can be a collection of one or more data objects and data structures that comprises a data key 114 and an encrypted data key structure 124. A cryptography service instance of a primary compute region 110 can obtain a request 104, and generate a response 122 in response to the request 104 that comprises a data key 114 and an encrypted data key structure 124. A cryptography service instance of a primary compute region 110 can provide a response 122 to a client 102. A client 102 can obtain a response 122 comprising a data key 114 and an encrypted data key structure 124. The data key 114 can be used to perform various cryptographic operations, such as encryption, decryption, digital signing, and the like. The encrypted data key structure 124 can be used in connection with various requests, such as a Decrypt request as described above, to obtain the data key 114.

For example, a client 102 submits a request 104 comprising regions 106, which indicate compute region-(A) and compute region-(B), and preferences 108, which indicate an order of the compute region-(A) followed by the compute region-(B). Continuing with the example, a cryptography service instance of a primary compute region 110 obtains the request 104, generates a data key 114 and encrypted data key structure 124 through one or more processes as described above, and provides the data key 114 and the encrypted data key structure 124 as a response 122 to the client 102. Further continuing with the example, the client 102 decrypts the encrypted data key structure 124 by submitting a Decrypt request comprising the encrypted data key structure 124 to an endpoint routing service. Further continuing with the example, the compute region-(A) is unavailable, in which the endpoint routing service determines, based on the order indicated by the preferences 108, to select the compute region-(B) (e.g., the order indicates the compute region-(A) followed by the compute region-(B), and the compute region (A) is unavailable, so the compute region-(B) is selected), and provides the encrypted data key structure 124 to a cryptography service instance of the compute region-(B), in which the cryptography service instance of the compute region-(B) decrypts an encrypted key of the encrypted data key structure 124 using a managed key corresponding to the compute region-(B), and provides the decrypted key to the client 102. Further information regarding an endpoint routing service can be found in the description of FIG. 3.

Figure 2:
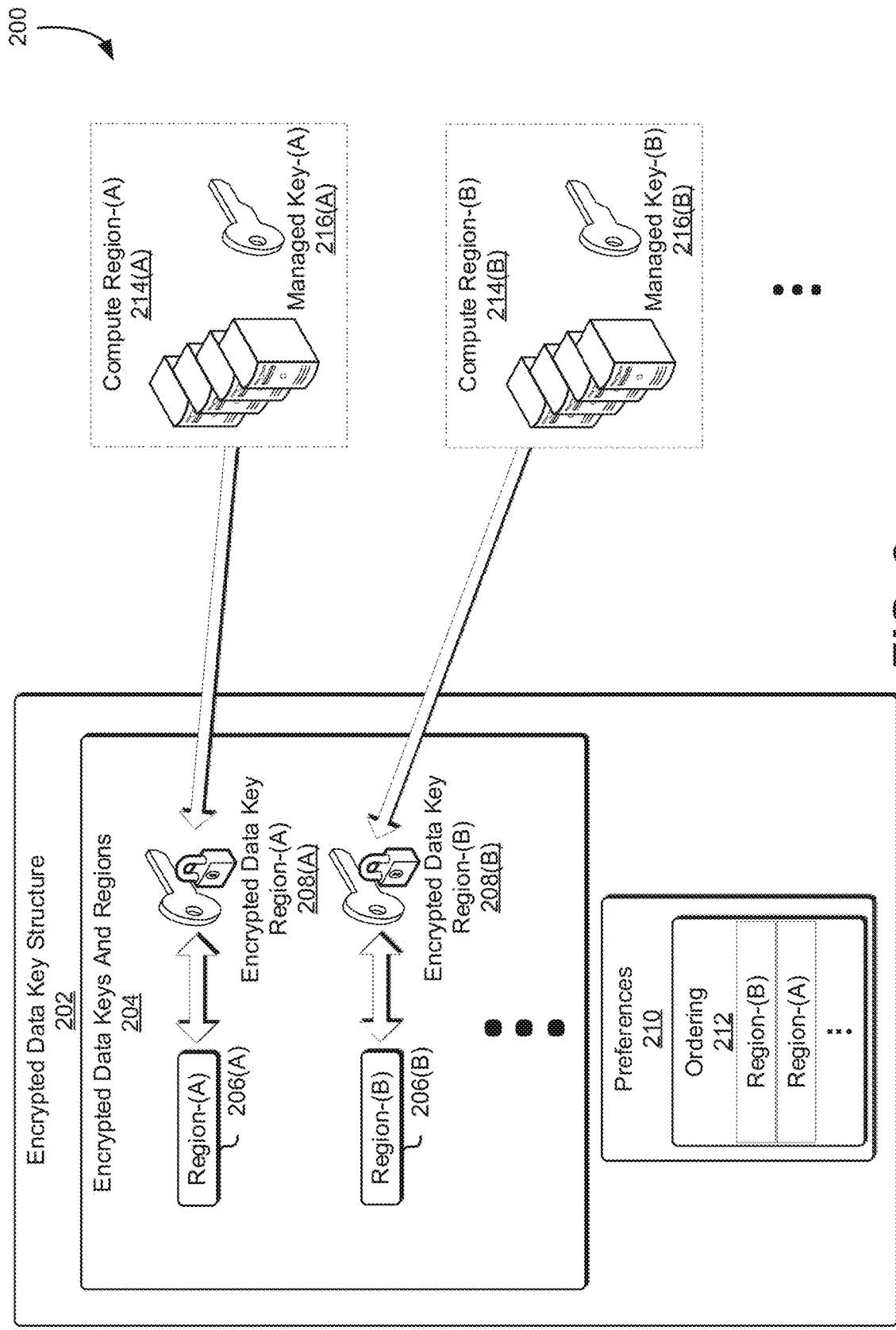
FIG. 2 shows an illustrative example of a computing environment of an encrypted data key structure.

FIG. 2 shows an illustrative example of a computing environment 200 of an encrypted data key structure. An encrypted data key structure 202, preferences 210, a compute region-(A) 214(A) comprising a managed key-(A) 216(A), and a compute region-(B) 214(B) comprising a managed key-(B) 216(B) can be in accordance with those described in connection with FIG. 1.

An encrypted data key structure 202 can be a data object that is generated by a cryptography service instance in response to a request, such as a GenerateDataKey request. An encrypted data key structure 202 can be an opaque data structure. An encrypted data key structure 202 can comprise one or more data structures, such as arrays, lists, tuples, and the like. An encrypted data key structure 202 can comprise encrypted data keys and regions 204. Encrypted data keys and regions 204 can be a data structure that comprises encrypted cryptographic keys (e.g., encrypted data keys) and associated compute regions. Encrypted data keys and regions 204 can comprise an encrypted data key region-(A) 208(A) associated with a region-(A) 206(A), which can be an identifier of a compute region-(A) 214(A), an encrypted data key region-(B) 208(B) associated with a region-(B) 206(B), which can be an identifier of a compute region-(B) 214(B), and can further include various other encrypted data keys associated with various other compute regions. Encrypted data keys can be associated with compute regions through a set of bindings, which can be a data structure such as an array that maps encrypted data keys to compute regions (e.g., the set of bindings can indicate that an encrypted data key region-(A) 208(A) is associated with a region-(A) 206(A)). In an embodiment, an encrypted data key associated with a compute region indicates that the encrypted data key was generated by encrypting a data key using a managed key from the compute region.

A region-(A) 206(A) and a region-(B) 206(B) can be identifiers corresponding to a compute region-(A) 214(A) and a compute region-(B) 214(B), respectively. A region-(A) 206(A) and a region-(B) 206(B) can be data objects that comprise information indicating a compute region-(A) 214 (A) and a compute region-(B) 214(B), respectively. An encrypted data key region-(A) 208(A) and an encrypted data key region-(B) 208(B) can be data keys that have been encrypted by a managed key-(A) 216(A) of a compute region-(A) 214(A) and a managed key-(B) 216(B) of a compute region-(B) 214(B), respectively. A cryptography service instance can generate a data key, cause the data key to be encrypted by a cryptography service instance of a compute region-(A) 214(A) using a managed key-(A) 216 (A) to obtain an encrypted data key region-(A) 208(A), and cause the data key to be encrypted by a cryptography service instance of a compute region-(B) 214(B) using a managed key-(B) 216(B) to obtain an encrypted data key region-(B) 208(B).

Preferences 210 can be a data object of an encrypted data key structure 202 that can indicate preferences for selecting a compute region. Preferences 210 can indicate criteria for selecting one or more compute regions, such as geographical requirements, latency requirements, or security requirements. Preferences 210 can be utilized by an endpoint routing service to determine a cryptography service instance of a compute region to access to perform decryption of an encrypted data key of encrypted data keys and regions 204. Preferences 210 can indicate an order of one or more compute regions as ordering 212. In some examples, preferences 210 does not comprise ordering 212 and comprises one or more data objects that indicate criteria for selecting one or more compute regions. In some examples, preferences 210 comprises ordering 212 in addition to one or more data objects that indicate criteria for selecting one or more compute regions. Ordering 212 can be a list or other data object that comprises an ordered list of compute regions. Ordering 212 can be utilized by an endpoint routing service to determine a cryptography service instance of a compute region to access to perform decryption of an encrypted data key of encrypted data keys and regions 204.

For example, ordering 212 indicates an order of region-(B) corresponding to compute region-(B) 214(B) followed by region-(A) corresponding to compute region-(A) 214(A), and so on. Continuing with the example, an endpoint routing service obtains an encrypted data key structure 202 as part of a Decrypt request from a client, and determines that the compute region-(B) 214(B) is unavailable. Further continuing with the example, the endpoint routing service, based on the ordering 212, determines to access a cryptography service instance of the compute region-(A) 214(A), and causes the cryptography service instance to decrypt an encrypted data key region-(A) 208(A) of the encrypted data key structure 202 corresponding to the compute region-(A) 214(A) (e.g., through a Decrypt request), and provide the decrypted data key to the client.

In an embodiment, a compute region, such as compute region-(A) 214(A) and compute region-(B) 214(B) as illustrated in FIG. 2, refers to a logical and/or physical partitioning of resources provided by a computing resource service provider that hosts a variety of services, such as a cryptography service, and provides a variety of resources in multiple locations (e.g., physical and/or geographic locations). A computing resource service provider can host or otherwise implement a cryptography service in multiple compute regions. A cryptography service, in an embodiment, is implemented in multiple compute regions such as compute region-(A) 214(A) and compute region-(B) 214(B) wherein each compute region has an instance of the cryptography service that is independent from other instances (e.g., implemented and/or using separate hardware such that a failure such as a power outage that affects one compute region does not affect availability of a cryptography service instance of another compute region). Referring to FIG. 2, compute region-(A) 214(A) can comprise a cryptography service instance and compute region-(B) 214(B) can comprise a different cryptography service instance.

A compute region-(A) 214(A) can comprise a managed key-(A) 216(A), which can be a cryptographic key that is created and maintained on behalf of a client by a cryptography service instance of the compute region-(A) 214(A). A compute region-(B) 214(B) can comprise a managed key-(B) 216(B), which can be a cryptographic key that is created and maintained on behalf of a client by a cryptography service instance of the compute region-(B) 214(B). In some examples, a client is associated with a managed key-(A) 214(A), a managed key-(B) 216(B), as well as other managed keys from other compute regions not depicted in FIG. 2. In some examples, a managed key-(A) 214(A) and a managed key-(B) 216(B) are created in response to one or more requests (e.g., CreateKey requests) from a client and associated with the client. In some examples, a managed key-(A) 214(A) and a managed key-(B) 216(B) are created in response to a request (e.g., a GenerateDataKey request) from a client and associated with the client.

For example, a client submits a request to a cryptography service instance of a compute region. The request can be a GenerateDataKey request such as those described in connection with FIG. 1. The request can indicate that a data key to be generated is a highly-available data key, and can indicate a managed key-(A) 216(A) of a compute region-(A) 214(A), and a managed key-(B) 216(B) of a compute region-(B) 214(B). The request can indicate preferences 210. Continuing with the example, the cryptography service instance generates a data key, submits a first request to a cryptography service instance of the compute region-(A) 214(A) to encrypt the data key using the managed key-(A) 216(A), submits a second request to a cryptography service instance of the compute region-(B) 214(B) to encrypt the data key using the managed key-(B) 216(B), and obtains, in response to the first request and the second request, an encrypted data key region-(A) 208(A) and an encrypted data key region-(B) 208(B), which are the data key encrypted with the managed key-(A) 216(A) and the managed key-(B) 216(B), respectively. Further continuing with the example, the cryptography service instance generates an encrypted data key structure 202 comprising a region-(A) 206(A) associated with the encrypted data key region-(A) 208(A), a region (B) 206(B) associated with the encrypted data key region-(B) 208(B), and the preferences 210, and returns the encrypted data key structure 202 to the client in response to the request.

Figure 3:
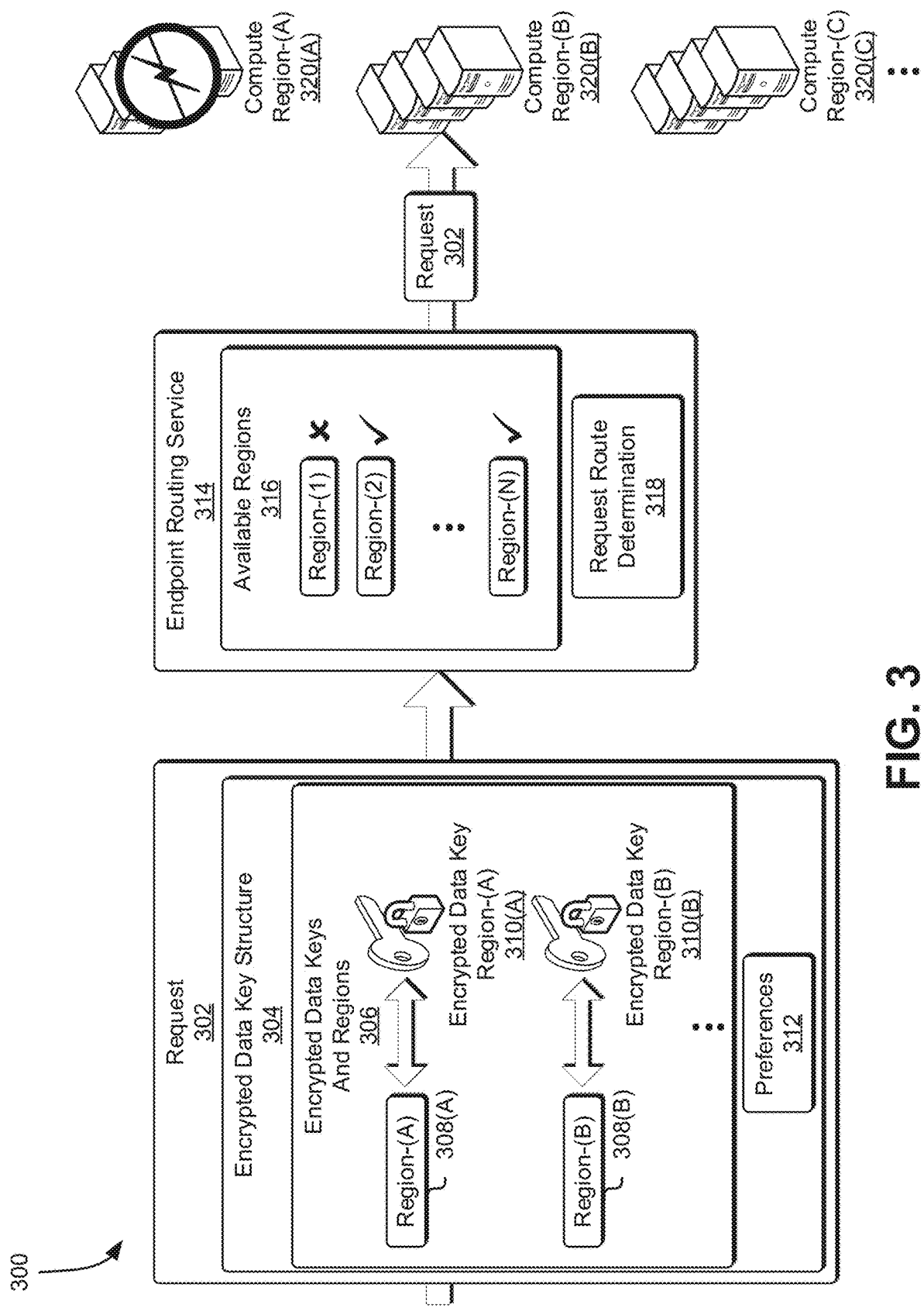
FIG. 3 shows an illustrative example of a computing environment of an endpoint routing service.

FIG. 3 shows an illustrative example of a computing environment 300 of an endpoint routing service. An endpoint routing service can be referred to as a forwarding service, a highly-available cryptography service endpoint, and the like. An encrypted data key structure 304, a compute region-(A) 320(A), a compute region-(B) 320(B), and a compute region-(C) 320(C) can be in accordance with those described in connection with FIG. 1 and FIG. 2.

A request 302 can be a Decrypt request such as those described in connection with FIG. 1. A request 302 can be a web service API request. A request 302 can be a collection of data that can indicate a cryptographic operation to be performed as well as data and other information associated with the cryptographic operation. A request 302 can be submitted by a client through one or more networks, such as the Internet. A request 302 can comprise an encrypted data key structure 304. An encrypted data key structure 304 can be a data structure generated by a cryptography service instance in response to a request, such as a GenerateDataKey request.

An encrypted data key structure 304 can comprise one or more data structures, such as arrays, lists, tuples, and the like. In some examples, an encrypted data key structure 304 is an opaque data structure that is interpretable by an endpoint routing service 314. An endpoint routing service 314 can perform various data interpretation processes to read encrypted data keys and regions 306 and preferences 312 of an encrypted data key structure 304, such as running a program or routine that may be provided by a cryptography service instance that generated the encrypted data key structure 304 to expose internal components of the encrypted data key structure 304, inputting the encrypted data key structure 304 to one or more programs of the endpoint routing service 314 that may interpret the encrypted data key structure 304, and the like. In some examples, an endpoint routing service 314 obtains executable code from a system or service such as a cryptography service instance that encodes credentials or other authentication information associated with the encrypted data key structure 304, in which the executable code, when executed, exposes internal components of the encrypted data key structure 304; the endpoint routing service 314 can execute the executable code in connection with the encrypted data key structure 304 to read encrypted data keys and regions 306 and preferences 312 of the encrypted data key structure 304. An endpoint routing service 314 may implement a set of functions that may analyze an encrypted data key structure 304 to determine encrypted data keys and regions 306 and preferences 312 of the encrypted data key structure 304. An encrypted data key structure 304 can comprise encrypted data keys and regions 306. Encrypted data keys and regions 306 can be a data structure that comprises encrypted data keys and associated compute regions. Encrypted data keys and regions 306 can comprise an encrypted data key region-(A) 310(A) associated with a region-(A) 308(A), which can be an identifier of a compute region-(A) 320(A), an encrypted data key region-(B) 310(B) associated with a region-(B) 308(B), which can be an identifier of a compute region-(B) 320(B), and can further include various other encrypted data keys associated with various other compute regions. Encrypted data keys can be associated with compute regions through a set of bindings, which can be a data structure, such as an array, that can be part of an encrypted data key structure 304 that maps encrypted data keys to compute regions (e.g., the set of bindings can indicate that an encrypted data key region-(A) 310(A) is associated with a region-(A) 308(A)). Preferences 312 can be a data object of an encrypted data key structure 304 that can indicate preferences for selecting a compute region. Preferences 312 can indicate criteria for selecting one or more compute regions, such as geographical requirements, latency requirements, or security requirements. Preferences 312 can indicate an order of one or more compute regions.

A request 302 can be transmitted to an endpoint routing service 314. An endpoint routing service 314 can be a software application or program that is executing on one or more computing devices, such as one or more computer servers. An endpoint routing service 314 can be executing on one or more routers or other computer network devices. An endpoint routing service 314 can have an associated identifier that clients can use to submit requests to the endpoint routing service 314. An endpoint routing service 314 can be identified by a network location, network address, and the like. In some examples, an endpoint routing service 314 is identified by a uniform resource locator (URL). In an embodiment, a request 302 is addressed to a URL of an endpoint routing service 314. An endpoint routing service 314 can comprise available regions 316, which can be a software component or program of the endpoint routing service 314. A request 302 can be fulfilled contingent on a compute region being available (e.g., a compute region being available such that a cryptography service instance of the compute region is accessible).

Available regions 316 can indicate availability of compute regions. Available regions 316 can indicate which compute regions have cryptography service instances that are accessible and/or available. A compute region can be available, which can refer to a state of the compute region in which one or more services of the compute region are accessible. A compute region can be unavailable, which can refer to a state of the compute region in which one or more services of the compute region are inaccessible. A compute region can be unavailable as a result of various events, such as power outages, network connectivity outages, and the like. For example, a compute region-(A) 320(A) is unavailable such that a cryptography service instance of the compute region-(A) 320(A) is unavailable to process and/or receive requests. Available regions 316 can indicate statuses of all compute regions of a computing resource service provider. Available regions 316 can indicate statuses of compute regions that comprise cryptography service instances. Referring to FIG. 3, available regions 316 indicates that a region (1) corresponding to a compute region-(1) is unavailable, while other regions corresponding to other compute regions are available.

An endpoint routing service 314 can comprise a request route determination 318, which can be a software component or program of the endpoint routing service 314. A request route determination 318 can be a collection of one or more computing resources that determines compute regions to route requests to. A request route determination 318 can comprise one or more functions, processes, and operations that, based at least in part on preferences 312 and available regions 316, determine a compute region to route a request 302 to.

In an embodiment, a compute region, such as compute region-(A) 320(A), compute region-(B) 320(B), and compute region-(C) 320(C) as illustrated in FIG. 3, refers to a logical and/or physical partitioning of resources provided by a computing resource service provider that hosts a variety of services, such as a cryptography service, and provides a variety of resources in multiple locations (e.g., physical and/or geographic locations). A cryptography service, in an embodiment, is implemented in multiple compute regions such as compute region-(A) 320(A), compute region-(B) 320(B), and compute region-(C) 320(C) wherein each compute region has an instance of the cryptography service that is independent from other instances. Referring to FIG. 3, compute region-(A) 320(A) can comprise a first cryptography service instance, compute region-(B) 320(B) can comprise a second cryptography service instance, and compute region-(C) 320(C) can comprise a third cryptography service instance.

Referring to FIG. 3, a compute region-(A) 320(A) can be unavailable such that a cryptography service instance of the compute region-(A) 320(A) is inaccessible. A compute region-(A) 320(A) can be unavailable as a result of a power outage, natural disaster, network outage, and the like that can affect operation of one or more computing resources of the compute region-(A) 320(A). An endpoint routing service 314 can obtain a request 302. In some examples, a request 302 is submitted by a client and is addressed to an endpoint routing service 314. In an embodiment, a request 302 is a request to decrypt an encrypted data key, and comprises an encrypted data key structure 304. Request route determination 318 can process preferences 312 of a request 302 in connection with available regions 316 to determine a compute region to route a request 302 to. An endpoint routing service 314 can determine that compute region-(B) 320(B) is an appropriate compute region to route a request 302, and transmit the request 302 to a cryptography service instance of the compute region-(B) 320(B). In some examples, an endpoint routing service 314 routes portions of a request 302 to a cryptography service instance of a compute region-(B) 320(B), such as an encrypted data key of the request 302 that was encrypted with a managed key of the cryptography service instance of the compute region-(B) 320(B). Further information regarding routing a request can be found in the description of FIG. 6.

For example, a request 302 is submitted by a client, in which the client's geographic location is closer to a geographical region of a compute region-(A) 320(A) than a geographical region of a compute region-(B) 320(B). Continuing with the example, preferences 312 indicates a criteria of geographical proximity, in which a compute region to be selected is to be a compute region that is closest geographically to the client. Further continuing with the example, an endpoint routing service 314 obtains the request 302, analyzes the preferences 312, determines that the compute region-(A) 320(A) is unavailable, and determines to select the compute region-(B) 320(B), in which the compute region-(B) 320(B) is the geographically closest available compute region to the client. Further continuing with the example, the endpoint routing service 314 then routes the request 302 to a cryptography service instance of the compute region-(B) 320(B). As another example, preferences 312 indicates an order of a compute region-(A) 320(A) followed by a compute region-(B) 320(B), in which an endpoint routing service 314 determines that the compute region-(A) 320(A) is unavailable, and routes a request 302 to a cryptography service instance of the compute region-(B) 320(B).

Figure 4:
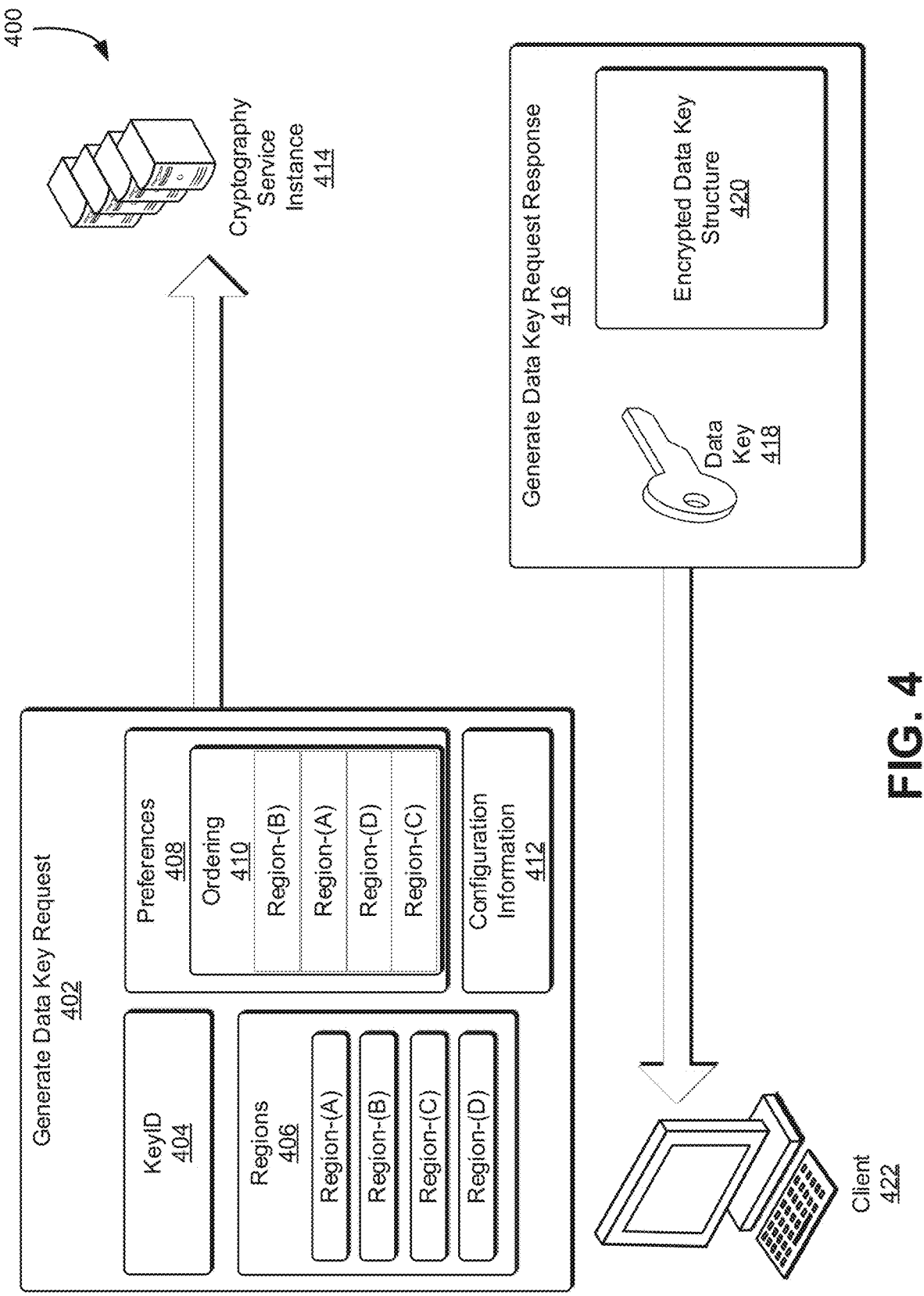
FIG. 4 shows an example diagram of a Generate Data Key request.

FIG. 4 shows an example diagram 400 of a Generate Data Key request. While FIG. 4 illustrates particular collections of information that can be included in a Generate Data Key request and/or a Generate Data Key request response, variations are within the scope of the present disclosure and a Generate Data Key request and/or a Generate Data Key request response can have fewer or more informational components. Additionally, not all API calls made using the same API function can include the same informational components. A type and/or existence of non-trivial information for one parameter can depend on a value of another parameter. A type and/or existence of non-trivial information for a component of a response can depend on a value of another parameter and/or a parameter of an API request that triggered the response. A Generate Data Key request 402 can correspond to a GenerateDataKey request such as those described in connection with FIG. 1.

A Generate Data Key request 402 can be used to cause a cryptography service instance to generate a data key and an encrypted data key structure. A Generate Data Key request 402 can be a collection of data objects and data structures that indicate aspects of a GenerateDataKey request. A Generate Data Key request 402 can comprise components KeyID 404, Regions 406, Preferences 408, and Configuration Information 412. KeyID 404 can be a data object such as a list or array that comprises identifiers of one or more managed keys of one or more compute regions. KeyID 404 can comprise identifiers of one or more managed keys that identify compute regions of the one or more managed keys (e.g., an identifier of a managed key comprises information that additionally indicates a compute region of the managed key). Regions 406 can be a data object such as a list or array that comprises identifiers of one or more compute regions. Regions 406 can specify a list of compute regions of one or more cryptography service instances. Regions 406 can indicate one or more compute regions of one or more managed keys.

Preferences 408 can be a data structure that comprises information indicating preferences for selecting a compute region. Preferences 408 can specify preferences that can determine which compute region of one or more compute regions to access for cryptographic operations. Preferences 408 indicate an order of compute regions or other logic to determine a compute region of one or more compute regions. Preferences 408 can indicate criteria for selecting one or more compute regions, such as geographical requirements, latency requirements, or security requirements. Referring to FIG. 4, preferences 408 comprises ordering 410, which is a list or other data object that comprises an ordered list of compute regions. In some examples, preferences 408 does not comprise ordering 410 and comprises one or more data objects that indicate criteria for selecting one or more compute regions. In some examples, preferences 408 comprises ordering 410 in addition to one or more data objects that indicate criteria for selecting one or more compute regions. Configuration Information 412 can be a data structure that comprises information that can specify other data associated with generating a data key. Configuration Information 412 can specify an encryption context, such as described above. Configuration Information 412 can specify a length and/or size of a data key to be generated. Configuration Information 412 can include one or more data objects that indicate an encryption context, length/size of a data key to be generated, and the like.

In some embodiments, KeyID 404 identifies one or more managed keys that exist in one or more compute regions. KeyID 404 can comprise cryptographic key identifiers. In some embodiments, KeyID 404 comprises identifiers of one or more managed keys that are to be created (e.g., keys that do not exist prior to the submission of a Generate Data Key request 402), and Regions 406 parameter indicates compute regions of cryptography service instances in which the one or more managed keys are to be created. For example, upon receipt of a Generate Data Key request 402, a cryptography service instance causes cryptography service instances of compute regions identified by Regions 406 to create managed keys, and associate the created managed keys with a client that submitted the Generate Data Key request 402; the managed keys can be identified by identifiers of KeyID 404.

A Generate Data Key request 402 can be utilized with fewer or more components than depicted in FIG. 4. In some embodiments, a Generate Data Key request 402 comprises information that indicates whether a data key to be generated is to be a highly-available data key. A highly-available data key can be referred to as a cross-region data key, multi-region data key, and the like. A Generate Data Key request 402 that can indicate that a data key to be generated is to be a highly-available data key can require components KeyID 404, Regions 406, Preferences 408, and Configuration Information 412. A Generate Data Key request 402 that can indicate that a data key to be generated is not to be a highly-available data key can, in some examples, not require all of components KeyID 404, Regions 406, Preferences 408, and Configuration Information 412. For example, a Generate Data Key request 402 that indicates that a data key to be generated is not to be a highly-available data key comprises KeyID 404, in which, upon receipt of the request, a cryptography service instance can generate a data key and encrypt the generated data key using a key specified by the KeyID 404, and return a plaintext data key and a corresponding ciphertext copy of the data key, encrypted by the key identified by the KeyID 404.

A Generate Data Key request 402 can be submitted by one or more clients through one or more web service interfaces. A Generate Data Key request 402 can be submitted to a cryptography service instance 414. A Generate Data Key request 402 can be submitted by a client 422 to a cryptography service instance 414. A Generate Data Key request 402 can be addressed to a cryptography service instance 414, such as via a URL, network location/address, or other identifier of the cryptography service instance 414. A client 422 can be any suitable computing device that can access one or more services provided by a computing resource service provider, such as a computer, mobile device, server, and the like. A cryptography service instance 414 can be an instance of a cryptography service operating in a compute region.

A Generate Data Key request response 416 can be a collection of data objects and data structures that indicate aspects of a response to a GenerateDataKey request. A Generate Data Key request response 416 can comprise a data key 418 and an encrypted data key structure 420. A data key 418 can be a cryptographic key that can be used for cryptographic operations such as encryption, decryption, digital signatures, and the like. An encrypted data key structure 420 can be an encrypted data key structure such as those described in connection with FIG. 2.

Upon receipt of a Generate Data Key request 402 from a client 422, a cryptography service instance 414 can generate a data key 418. The cryptography service instance 414 can encrypt the data key 418 using a managed key of the cryptography service instance 414 which can be identified in KeyID 404. The cryptography service instance 414 can submit requests to encrypt the data key 418 to cryptography service instances of compute regions which can be identified in Regions 406 using managed keys which can be identified in the KeyID 404. The cryptography service instance 414 can obtain a set of encrypted data keys that comprises the data key 418 encrypted by the cryptography service instance 414 as well as the data key 418 encrypted by the cryptography service instances of the compute regions. The cryptography service instance 414 can generate an encrypted data key structure 420 that comprises at least the set of encrypted data keys, and Preferences 408 and Regions 406. The cryptography service instance 414 can provide the data key 418 and the encrypted data key structure 420 as part of a Generate Data Key request response 416 to the client 422 in response to the Generate Data Key request 402.

Variations of Generate Data Key requests described in connection with FIG. 4 may exist. For example, A GenerateDataKeyWithoutPlaintext request may utilized techniques described above, but not provide the data key 418 as part of the request response. In some cases, different APIs are used to generate symmetric and asymmetric keys—for example, GenerateDataKey may be used to generate a symmetric key whereas GenerateDataKeyPair may be used to generate an asymmetric data key pair. In a response to a GenerateDataKeyPair request, a key pair may be provided in plaintext (e.g., both the public and private key of an asymmetric key pair) as well as an encrypted data key structure that includes ciphertexts of the private key but not the public key. A GenerateDataKeyPairWithoutPlaintext request may be similar to GenerateDataKeyWithoutPlaintext in that the secret cryptographic material (e.g., private key) is not provided in the response in a plaintext format.

Figure 5:
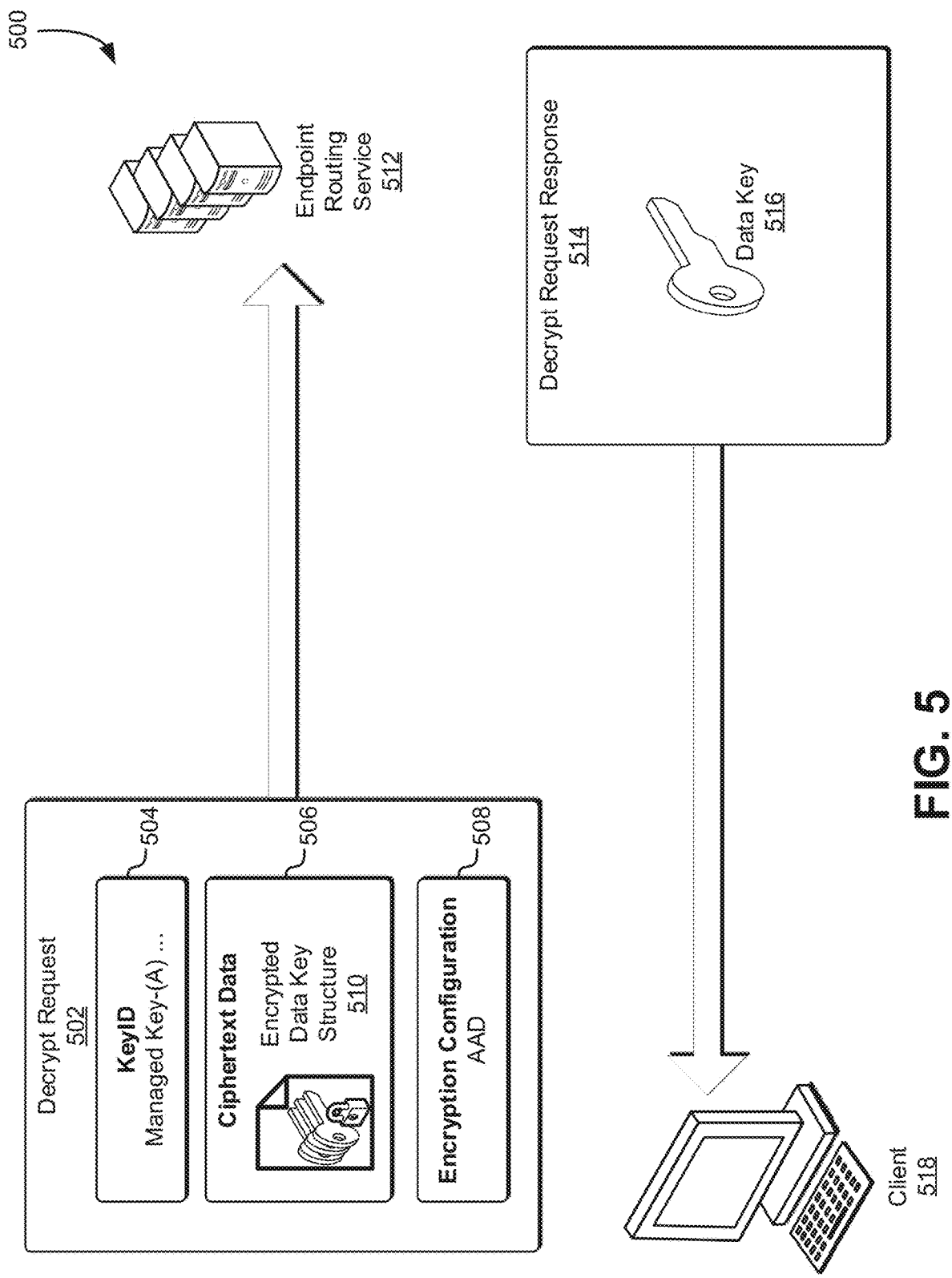
FIG. 5 shows an example diagram of a Decrypt request.

FIG. 5 shows an example diagram 500 of a Decrypt request. While FIG. 5 illustrates particular collections of information that can be included in a Decrypt request and/or a Decrypt request response, variations are within the scope of the present disclosure and a Decrypt request and/or a Decrypt request response can have fewer or more informational components. Additionally, not all API calls made using the same API function can include the same informational components. A type and/or existence of non-trivial information for one parameter can depend on a value of another parameter. A type and/or existence of non-trivial information for a component of a response can depend on a value of another parameter and/or a parameter of an API request that triggered the response. A Decrypt request 502 can correspond to a Decrypt request such as those described in connection with FIG. 1.

A Decrypt request 502 can be used to cause a cryptography service instance to decrypt an encrypted data key. A Decrypt request 502 can be used to obtain a plaintext cryptography key (e.g., plaintext data key). A Decrypt request 502 can be a collection of data objects and data structures that indicate aspects of a Decrypt request. A Decrypt request 502 can comprise components KeyID 504, Ciphertext Data 506, and Encryption Configuration 508. KeyID 504 can be a data object such as a list, array, or string that indicates or otherwise identifies one or more managed keys of one or more compute regions. KeyID 504 can comprise identifiers of one or more managed keys that identify compute regions of the one or more managed keys (e.g., an identifier of a managed key comprises information that additionally indicates a compute region of the managed key). Ciphertext Data 506 can be a data object or data structure that indicates ciphertext to be decrypted. Ciphertext Data 506 can include data objects comprising ciphertext. Ciphertext Data 506 can include an encrypted data key structure, such as encrypted data key structure 510, which can be an encrypted data key structure such as those described in connection with FIG. 2.

Encryption Configuration 508 can be a data object or data structure that indicates an encryption algorithm or encryption context to use to decrypt data. Encryption Configuration 508 can include one or more data objects, such as strings, that indicate or otherwise comprise encryption information to utilize to decrypt data. Encryption Configuration 508 can specify an AAD as described above. In some embodiments, Encryption Configuration 508 specifies an encryption algorithm to use to decrypt data. An encryption algorithm can only be specified if a cryptographic key indicated by KeyID 504 is asymmetric cryptographic key. In some embodiments, Encryption Configuration 508 specifies an encryption context. An encryption context can be information that can be utilized to decrypt data. An encryption context can specify data such as AAD as described above. An encryption context can only be specified if a cryptographic key indicated by KeyID 504 is a symmetric cryptographic key. Referring to FIG. 5, KeyID 504 comprises one or more identifiers of managed keys, Ciphertext Data 506 comprises an encrypted data key structure 510, and Encryption Configuration 508 comprises an AAD.

A Decrypt request 502 can be submitted to a cryptography service instance or an endpoint routing service 512. In some examples, a Decrypt request 502 is obtained by a cryptography service instance, in which the cryptography service instance decrypts ciphertext indicated by Ciphertext Data 506 using one or more keys indicated by KeyID 504 and encryption information indicated by Encryption Configuration 508. In some examples, a Decrypt request 502 is obtained by an endpoint routing service 512 and routed to an appropriate cryptography service instance. In some examples, an endpoint routing service 512 routes portions of a Decrypt request 502 to a cryptography service instance of an available compute region, such as an encrypted data key of the Decrypt request 502 that was encrypted with a managed key of the cryptography service instance of the available compute region, as described in greater detail with respect to FIG. 6. An endpoint routing service 512 can be a software application or program that determines cryptography service instances of compute regions to route requests for cryptographic operations to. An endpoint routing service 512 can be an endpoint routing service such as those described in connection with FIG. 3.

A Decrypt request 502 can be submitted by one or more clients through one or more web service interfaces. A Decrypt request 502 can be submitted to an endpoint routing service 512. A Decrypt request 502 can be submitted by a client 518 to an endpoint routing service 512. A Decrypt request 502 can be addressed to an endpoint routing service 512, such as via a URL, network location/address, or other identifier of the endpoint routing service 512. A client 518 can be any suitable computing device that can access one or more services provided by a computing resource service provider, such as a computer, mobile device, server, and the like.

A Decrypt request response 514 can be a collection of data objects and data structures that indicate aspects of a response to a Decrypt request. A Decrypt request response 514 can comprise a data key 516. A data key 516 can be a cryptographic key that can be used for cryptographic operations such as encryption, decryption, digital signatures, and the like. An encrypted data key structure 510 can comprise a data key 516 that has been encrypted using managed keys of one or more compute regions.

Upon receipt of a Decrypt request 502, an endpoint routing service 512 can analyze an encrypted data key structure 510 to determine an available compute region based at least in part on preferences and regions indicated by the encrypted data key structure 510; the endpoint routing service 512 can then route the Decrypt request 502 to a cryptography service instance of the available compute region, in which the cryptography service instance can inspect the encrypted data key structure 510 to determine an encrypted key corresponding to the available compute region and decrypt the encrypted key using a managed key specific to the available compute region that is identified by KeyID 504 to determine a data key 516. The cryptography service instance can provide the data key 516 in response to the Decrypt request as Decrypt request response 514 to a client 518.

Figure 6:
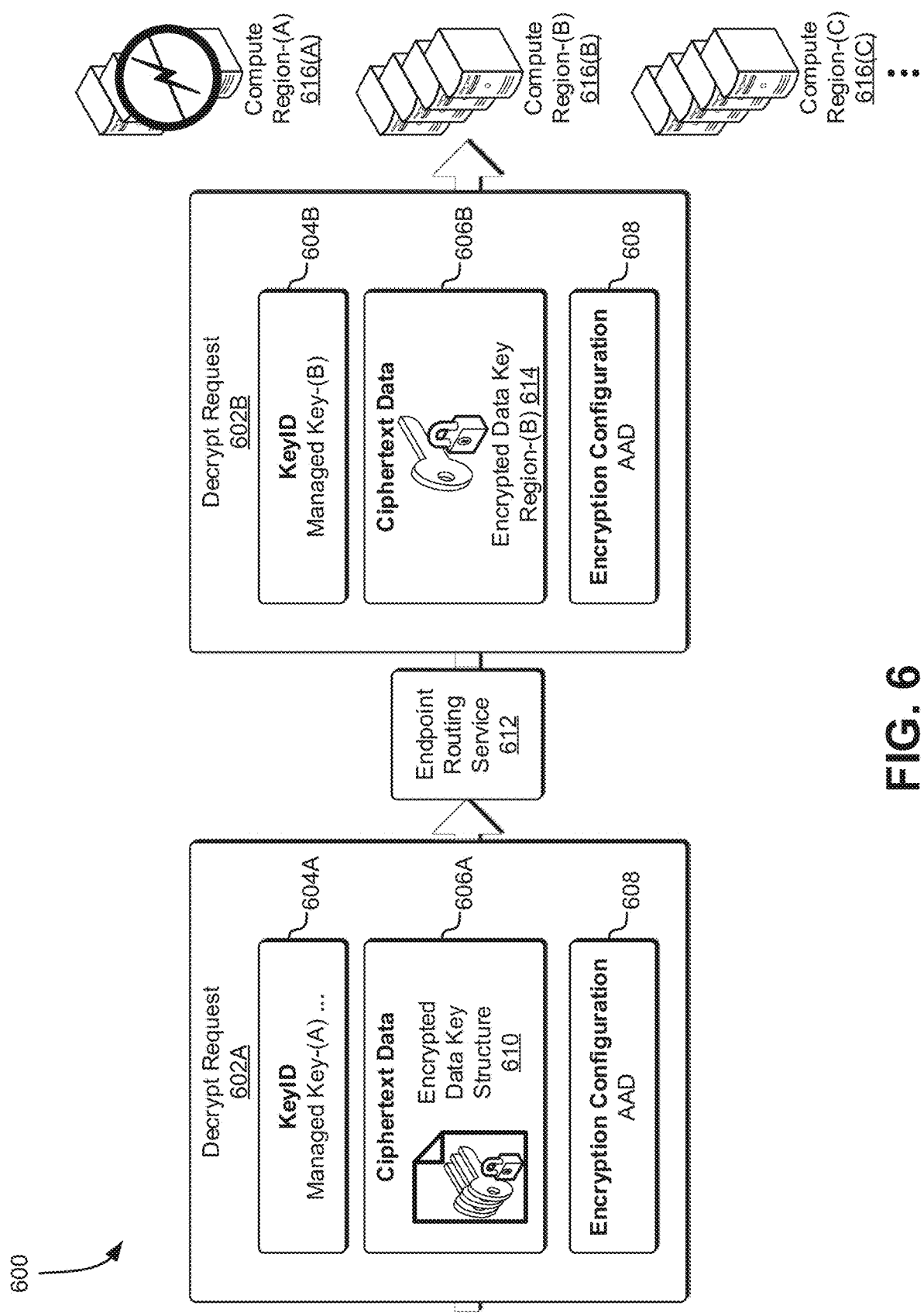
FIG. 6 shows an illustrative example of a computing environment of a Decrypt request.

FIG. 6 shows an illustrative example of a computing environment 600 of a Decrypt request. The computing environment 600 includes an endpoint routing service 612 that routes portions of a Decrypt request 602A as a Decrypt request 602B to a cryptography service instance of a compute region-(B) 616(B). A Decrypt request 602A can be a Decrypt request such as those described in connection with FIG. 5.

A Decrypt request 602A can be used to cause a cryptography service instance to decrypt an encrypted data key. A Decrypt request 602A can be a collection of data objects and data structures that indicate aspects of a Decrypt request. A Decrypt request 602A can comprise components KeyID 604A, Ciphertext Data 606A, and Encryption Configuration 608. KeyID 604A can be a data object such as a list, array, or string that indicates or otherwise identify one or more managed keys of one or more compute regions. Ciphertext Data 606A can be a data object or data structure that indicates ciphertext to be decrypted. Ciphertext Data 606A can comprise an encrypted data key structure 610, which can be an encrypted data key structure such as those described in connection with FIG. 2. Encryption Configuration 608 can be a data object or data structure that indicates an encryption algorithm or encryption context to use to decrypt data.

A Decrypt request 602A can be submitted by one or more clients through one or more web service interfaces. A Decrypt request 602A can be submitted to an endpoint routing service 612. A Decrypt request 602A can be submitted by a client to an endpoint routing service 612. A Decrypt request 602A can be addressed to an endpoint routing service 612, such as via a URL, network location/address, or other identifier of the endpoint routing service 612. An endpoint routing service 612 can be a software application or program that determines cryptography service instances of compute regions to route requests for cryptographic operations to. An endpoint routing service 612 can be an endpoint routing service such as those described in connection with FIG. 3.

Upon receipt of a Decrypt request 602A, an endpoint routing service 612 can analyze an encrypted data key structure 610 to determine an available compute region based at least in part on preferences and regions indicated by the encrypted data key structure 610. An endpoint routing service 612 can route a Decrypt request 602A as a Decrypt request 602B to a cryptography service instance of an available compute region based at least in part on preferences and regions indicated by an encrypted data key structure 610. For example, an encrypted data key structure 610 indicates a compute region-(A) 616(A), a compute region-(B) 616(B), and a compute region-(C) 616(C), and a preference of an order, in which the order indicates the compute region-(A) 616(A), followed by the compute region-(B) 616(B), followed by the compute region-(C) 616(C). Continuing with the example, an endpoint routing service 612 obtains a Decrypt request 602A and determines that the compute region-(A) 616(A) is unavailable and the compute region-(B) 616(B) is available, and routes the Decrypt request 602A as a Decrypt request 602B to a cryptography service instance of the compute region-(B) 616(B). Further continuing with the example, the cryptography service instance of the compute region-(B) decrypts an encrypted key corresponding to the compute region-(B) of the encrypted data key structure 610 (e.g., an encrypted data key region-(B) 614) using a managed key specific to the cryptography service instance of the compute region-(B) (e.g., managed key-(B)) that is identified by KeyID 604B to determine a decrypted data key; the cryptography service instance can provide the data key to a client that submitted the Decrypt request 602A.

In some embodiments, a Decrypt request 602B is identical to a Decrypt request 602A (e.g., comprises the same components). In some embodiments, Decrypt request 602B comprises a subset of information of a Decrypt request 602A. An endpoint routing service 612 can route portions of a Decrypt request 602A as a Decrypt request 602B to a cryptography service instance of a compute region. Referring to FIG. 6, KeyID 604B of a Decrypt request 602B comprises a managed key-(B), which can be part of a larger list of managed keys indicated in KeyID 604A of a Decrypt request 602A. Referring to FIG. 6, Ciphertext Data 606B of a Decrypt request 602B comprises an encrypted data key region-(B) 614, which can be part of an encrypted data key structure 610 of Decrypt request 602A.

An endpoint routing service 612 can route portions of a Decrypt request to a cryptography service instance of a compute region that correspond to the cryptography service instance of the compute region (e.g., a managed key identifier and/or encrypted data key that correspond to the cryptography service of the compute region). For example, an endpoint routing service 612 obtains a Decrypt request 602A, and determines, through one or more processes as described above, to route the Decrypt request 602A as a Decrypt request 602B to a cryptography service instance of a compute region-(B) 616(B). Continuing with the example, the endpoint routing service 612 generates the Decrypt request 602B, in which KeyID 604B comprises an identifier of a managed key-(B), which is a managed key of the compute region-(B) 616(B) that was used by the cryptography service instance to encrypt a data key to generate an encrypted data key region-(B) 614, and Ciphertext Data 606B comprises the encrypted data key region-(B) 614, which is an encrypted data key that was generated by the cryptography service instance of the compute region-(B) 616(B). Further continuing with the example, the cryptography service instance of the compute region-(B) 616(B) obtains the Decrypt request 602B, and decrypts the encrypted data key region-(B) 614 of the Ciphertext Data 606B using the managed key-(B) that is identified by the KeyID 604B to determine a decrypted data key; the cryptography service instance can provide the data key to a client that submitted the Decrypt request 602A.

Figure 7:
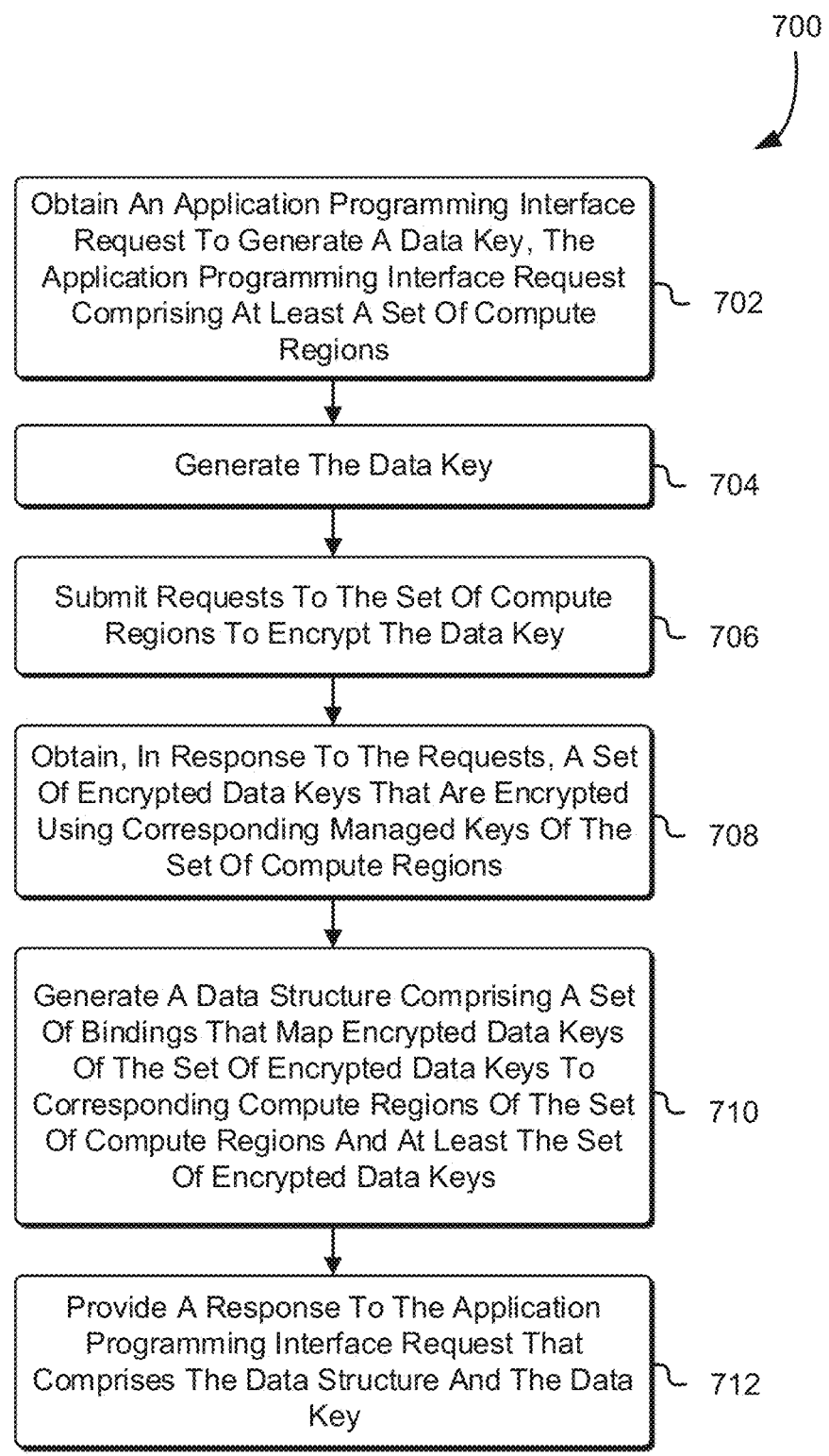
FIG. 7 shows an illustrative example of a process to generate a highly-available data key.

FIG. 7 shows an illustrative example of a process 700 to generate a highly-available data key. Some or all of process 700 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable medium. At least some computer-readable instructions usable to perform process 700 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 700 is performed at least in part on a computer system such as those described elsewhere in this disclosure. The process 700 can be performed by various suitable cryptography service instances described throughout this disclosure, such as cryptography service instances described in connection with FIGS. 1-6.

A system performing at least a part of the process 700 includes executable code to at least obtain 702 an application programming interface request to generate a data key, the application programming interface (API) request comprising at least a set of compute regions. In at least one embodiment, the API request is a GenerateDataKey request such as those described in connection with FIG. 1. The API request can be a request to generate a highly-available encrypted data key, and can be obtained through one or more networks. The request can comprise at least the following components: KeyID, Regions, Preferences, and Configuration Information.

KeyID can be a data object such as a list or array that comprises identifiers of one or more managed keys of one or more compute regions. KeyID can comprise identifiers of one or more managed keys that identify compute regions of the one or more managed keys (e.g., an identifier of a managed key comprises information that additionally indicates a compute region of the managed key). Regions can be a data object such as a list or array that comprises identifiers of one or more compute regions. Regions can specify a list of compute regions of one or more cryptography service instances. Preferences can be a data structure that comprises information indicating preferences for selecting a compute region. Preferences can specify preferences that can determine which compute region of one or more compute regions to access for cryptographic operations. Preferences can indicate an order of compute regions or other logic to determine a compute region of one or more compute regions. Configuration Information can be a data structure that comprises information that can specify other data associated with generating a data key. Configuration Information can include one or more data objects that indicate an encryption context, length/size of a data key to be generated, and the like.

A system performing at least a part of the process 700 includes executable code to at least generate 704 the data key. The system can generate the data key through various cryptographic functions. The system can generate the data key using one or more key derivation functions. The data key can be generated based at least in part on Configuration Information indicated in a request, which can indicate characteristics of the data key, such as a length of the data key, a size of the data key, certain restrictions of the data key (e.g., available alphanumeric characters to use to generate the data key), and the like.

A system performing at least a part of the process 700 includes executable code to at least submit 706 requests to the set of compute regions to encrypt the data key. The requests can be Encrypt requests, such as those described in connection with FIG. 1. The requests can comprise the data key and identifiers of managed keys of compute regions of the set of compute regions to use to encrypt the data key. The system can submit the requests to cryptography service instances of compute regions of the set of compute regions. The system can generate the requests and submit the requests to cryptography service instances through one or more networks. The cryptography service instances can obtain the requests and encrypt the data key using managed keys identified in the requests.

A system performing at least a part of the process 700 includes executable code to at least obtain 708, in response to the requests, a set of encrypted data keys that are encrypted using corresponding managed keys of the set of compute regions. The requests can cause cryptography service instances of compute regions of the set of compute regions to encrypt a data key using managed keys identified in the requests. For example, a first request of the requests causes a cryptography service instance of a compute region to encrypt a data key using a managed key, in which the data key is obtained from the first request and the managed key is identified in the first request. The system can obtain a response to each request of the requests that comprises an encrypted data key to obtain the set of encrypted data keys.

A system performing at least a part of the process 700 includes executable code to at least generate 710 a data structure comprising a set of bindings that map encrypted data keys of the set of encrypted data keys to corresponding compute regions of the set of compute regions and at least the set of encrypted data keys. The data structure can be referred to as an encrypted data key structure. The data structure can be an opaque data structure such that internal components of the data structure (e.g., encrypted data keys and regions, preferences) are not readable by the requestor from step 702. The data in the opaque data structure may be opaque such that the requestor may be unable to interpret the opaque data structure. The data structure can comprise an encrypted data keys and regions data structure and a preferences data structure. The data structure can be opaque such that an encrypted data keys and regions data structure and a preferences data structure of the data structure are not readable by the requestor from step 702, and the requestor can be unable to interpret opaque data. As described herein, opaque data can be any form of hidden data such that it is difficult or impossible for some parties to determine the underlying hidden data given only the opaque data. In some embodiments, opaque data is generated through the use of encryption. Opaque data can be interpretable by a system (e.g., endpoint routing services and/or cryptography service instances) without the need to perform cryptographic operations (e.g., decryption). For example, in various embodiments, endpoint routing service is able to identify a specific cryptography service instance to route a request to without necessarily requiring that the endpoint routing service to have the ability to decrypt encrypted data keys included in the request. The data structure can comprise encrypted data keys associated with compute regions. The data structure can comprise preferences which can be indicated in an obtained API request. The set of bindings can be a data structure such as an array that maps encrypted data keys to compute regions (e.g., the set of bindings can indicate that a particular encrypted data key is associated with a particular compute region). In some cases, the set of bindings is or includes a list of network addresses, IP addresses, or other information associated with corresponding compute regions of a list of compute regions—for example, the first compute region in a list of compute regions can be contacted (e.g., to determine availability) via the first binding of the set of bindings.

A system performing at least a part of the process 700 includes executable code to at least provide 712 a response to the application programming interface request that comprises the data structure and the data key. The system can provide the response through one or more networks to a client. The response can comprise the data structure, also referred to as an encrypted data key structure, and the data key. The response can comprise metadata associated with the data structure and the data key. The client can obtain the response, and use the data key in one or more cryptography operations (e.g., encryption, decryption, digital signing). The client can discard or otherwise delete the data key after performing the one or more cryptography operations, in which the data structure can be usable by the client to obtain the data key.

Figure 8:
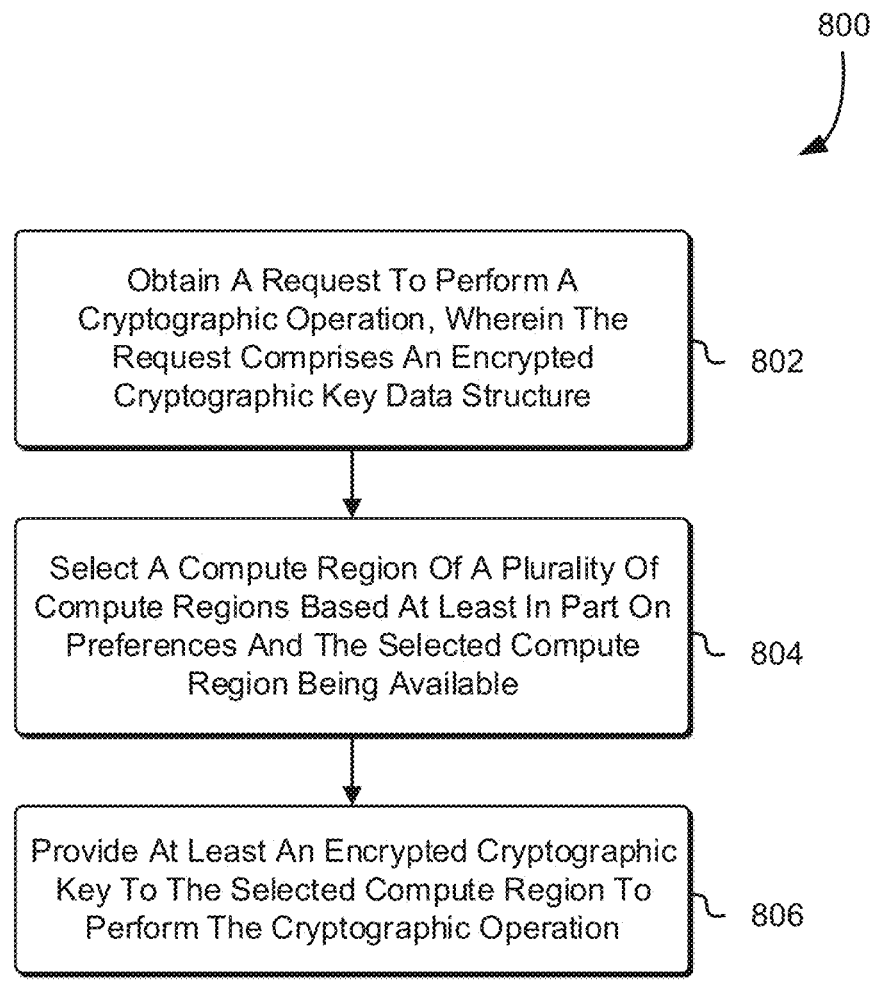
FIG. 8 shows an illustrative example of a process to perform a cryptographic operation using an encrypted cryptographic key data structure.

FIG. 8 shows an illustrative example of a process 800 to perform a cryptographic operation using an encrypted cryptographic key data structure. Some or all of process 800 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable medium. At least some computer-readable instructions usable to perform process 800 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 800 is performed at least in part on a computer system such as those described elsewhere in this disclosure. The process 800 can be performed by various suitable endpoint routing services described throughout this disclosure, such as an endpoint routing service as described in connection with FIG. 3. An encrypted cryptographic key data structure can be referred to as an encrypted data key structure.

A system performing at least a part of the process 800 includes executable code to at least obtain 802 a request to perform a cryptographic operation, wherein the request comprises an encrypted cryptographic key data structure. The encrypted cryptographic key data structure can be referred to as a data structure or encrypted data key structure. The request can be a request to perform a decryption operation, such as a Decrypt request as described in connection with FIG. 1. In some embodiments, the system is an endpoint routing service, in which the request is submitted to the system via URL or other identifier of the endpoint routing service. The request can be submitted by one or more clients through one or more networks, such as the Internet.

A system performing at least a part of the process 800 includes executable code to at least select 804 a compute region of a plurality of compute regions based at least in part on preferences and the selected compute region being available. The preferences can be indicated in an encrypted cryptographic key data structure of an obtained request. The preferences can indicate criteria for selecting one or more compute regions, such as geographical requirements, latency requirements, or security requirements. Geographical requirements can be based on proximity requirements, in which compute regions are to be selected based on proximity (e.g., a closest compute region is selected first, a farthest compute region is selected first, or the like). Latency requirements can be based on network latency requirements, in which compute regions are to be selected based on network latency (e.g., a compute region with a lowest network latency is selected first, a compute region with a highest network latency is selected first, or the like). Security requirements can be based on various legal and/or security requirements, in which compute regions are to be selected based on legal and/or security characteristics (e.g., a compute region with specific legal and/or security characteristics is selected first, or the like). The preferences can indicate an order of one or more compute regions, in which compute regions are selected in the indicated order.

The system can determine availability of the plurality of compute regions. The system can comprise various software programs that can monitor statuses of compute regions of the plurality of compute regions. The system can access compute regions of the plurality of compute regions to determine which compute regions are available and/or accessible. The system can submit various messages to compute regions, and determine, by responses or lack of responses to the messages, which compute regions are available (e.g., compute regions that are not available cannot respond to messages or responses to those messages are error responses). For example, the system pings each compute region of the plurality of compute regions, and, based on responses or lack of responses to the pings, determines which compute regions are unavailable/unreachable (e.g., a ping to a compute region that is unavailable results in an error indication). In some cases, the system caches connectivity data for various compute regions. The system can continuously ping compute regions according to various time intervals to determine availability of compute regions of the plurality of compute regions. In some examples, a compute region is unavailable such that a cryptography service instance of the compute region is inaccessible. A compute region can be unavailable as a result of various events, such as power outages, natural disasters, network outages, and the like, which can affect computing resources of the compute region.

The system, based on the availability of the compute regions, utilizes the preferences to select the compute region. The system can comprise various software programs that encode various logic, functions, and processes that can analyze available compute regions and select a compute region of the available compute regions based on preferences. The system analyzes available compute regions and selects a compute region based on the preferences. For example, the preferences indicate criteria of geographical proximity, in which the system selects a compute region that is closest geographically to a client that submitted a request. As another example, the preferences indicate criteria of network latency, in which the system selects a compute region with the lowest network latency. As another example, the preferences indicate criteria of security or legal requirements, in which the system selects a compute region that satisfies the security or legal requirements. The system can determine a cryptography service instance of the selected compute region to access.

A system performing at least a part of the process 800 includes executable code to at least provide 806 at least an encrypted cryptographic key to the selected compute region to perform the cryptographic operation. The system can provide the encrypted cryptographic key to a cryptography service instance of the selected compute region. The encrypted cryptographic key can be a data key that was encrypted using a managed key from the selected compute region. The system can provide the encrypted cryptographic key as part of a larger data structure to the selected compute region. In some examples, the system provides the encrypted cryptographic key to the selected compute region. The system can route an obtained request to the selected compute region. In some examples, the system routes portions of the obtained request to a cryptography service instance of the selected compute region.

The system can provide the encrypted cryptographic key to the selected compute region in the form of a request. The request can be transmitted to a cryptography service instance of the selected compute region, and can be a Decrypt request such as those described in connection with FIG. 1. The request can comprise a data structure that comprises the encrypted cryptographic key. The request can comprise the encrypted cryptographic key by itself (e.g., not part of a larger data structure). The cryptography service instance can obtain the request, and decrypt the encrypted cryptographic key. The cryptography service instance can provide a decrypted key determined based at least in part on an encrypted cryptography key data structure to a client in response to a request that comprises the encrypted cryptography key data structure.

Figure 9:
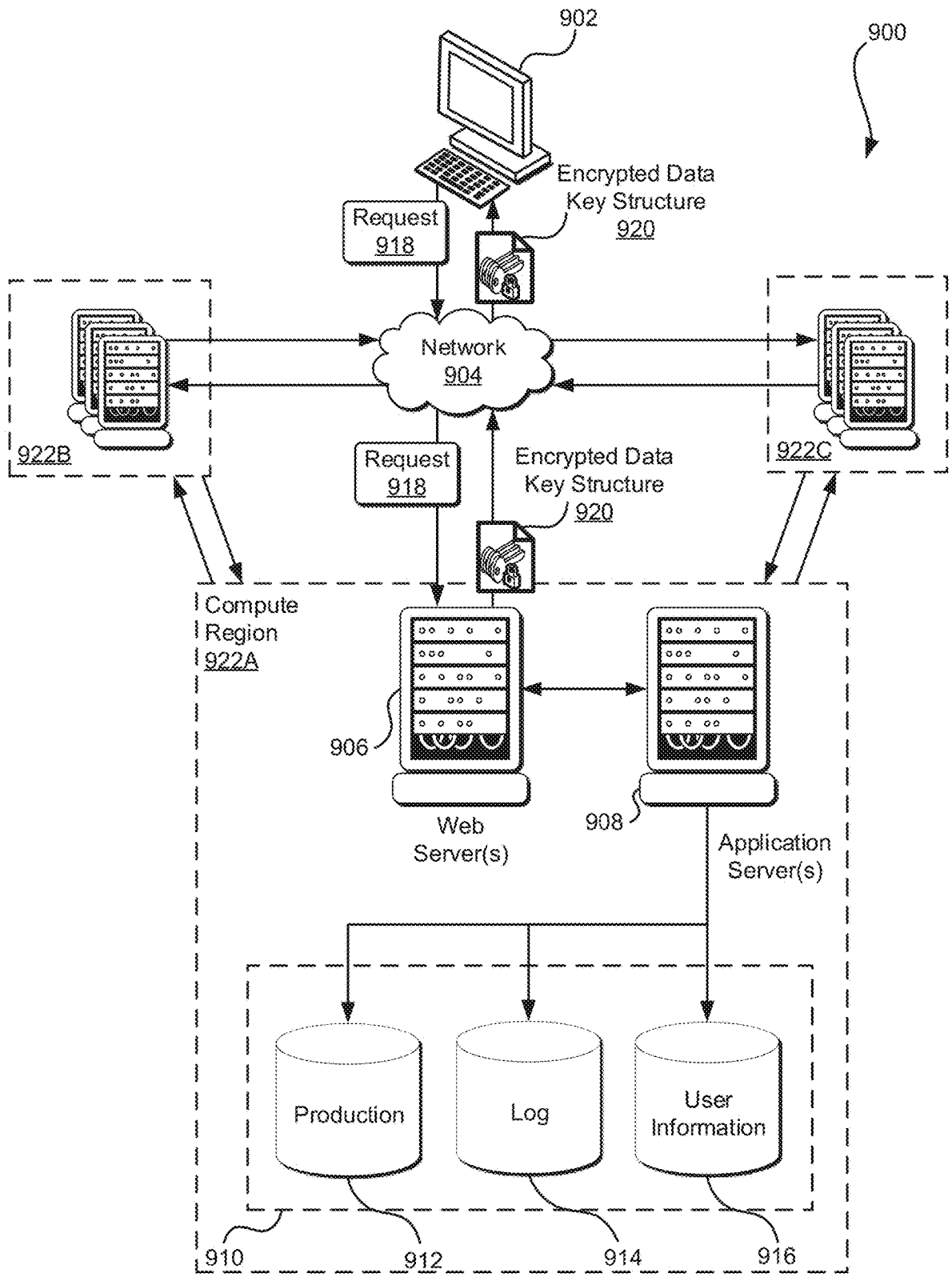
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems can be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which can be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which can include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video, and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update, or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

The device 902 can submit a request 918 to the web server 906 in a compute region 922A. The compute region 922A may host or otherwise implement a cryptography service instance. The request 918 can be a GenerateDataKey request as described in connection with FIG. 1. The request 918 can be a request for a highly-available data key, and can indicate regions, preferences, key identifiers, encryption configuration information, as well as other information. The web service 906 can generate an encrypted data key structure 920 through various processes, such as those described in connection with FIGS. 1-8. The web service 906 can generate the encrypted data key structure 920 in connection with cryptography service instances of compute regions 922B and 922C. The device 902 can obtain the encrypted data key structure 920, and use the encrypted data key structure 920 in one or more cryptographic operations.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system can be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes can be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set can be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., can be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments can become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining an application programming interface request to generate a data key, the application programming interface request indicating:
        a set of compute regions, at least one compute region in the set of compute regions indicating a geographic location or region; and
        a set of compute region preferences;
    generating the data key;
    submitting requests to the set of compute regions to encrypt the data key;
    obtaining, in response to the requests, a set of encrypted data keys that are encrypted using corresponding managed keys of the set of compute regions;
    generating a data structure comprising:
        the set of compute region preferences;
        the set of encrypted data keys; and
        a set of bindings that map encrypted data keys of the set of encrypted data keys to corresponding compute regions of the set of compute regions; and
    providing a response to the application programming interface request that comprises at least the data structure.

2. The computer-implemented method of claim 1, the application programming interface request is a web service application programming interface request encoding parameters for:
    a set of cryptographic key identifiers for the managed keys of the set of compute regions;
    the set of compute regions;
    the set of compute region preferences; and
    configuration information for generating the data key.

3. The computer-implemented method of claim 1, further comprising:
    obtaining a second application programming interface request to decrypt the data key, the second application programming interface request comprising the data structure;
    inspecting the data structure to determine a first encrypted data key of the set of encrypted data keys corresponding to a managed key;
    decrypting the first encrypted data key using the managed key to determine a plaintext of the data key; and
    providing a second response to the second application programming interface request that comprises the plaintext of the data key.

4. The computer-implemented method of claim 1, wherein:
    the application programming interface request further comprises a set of cryptographic key identifiers that identify the corresponding managed keys; and
    the requests to the set of compute regions to encrypt the data key comprise at least the set of cryptographic key identifiers.

5. A system, comprising:
    one or more processors; and
    memory that stores computer-executable instructions that are executable by the one or more processors to cause the system to:
        obtain a request to perform a cryptographic operation, wherein the request comprises an encrypted cryptographic key data structure, and further wherein the encrypted cryptographic key data structure comprises:
            a plurality of encrypted cryptographic keys;
            identifiers for a plurality of compute regions corresponding to the plurality of encrypted cryptographic keys, at least one of the plurality of compute regions indicating a geographic location or region; and
            preferences indicating how to determine which compute region of the plurality of compute regions to use to perform cryptographic operations;

select a compute region of the plurality of compute regions based at least in part on the preferences and the selected compute region being available; and provide at least an encrypted cryptographic key to the selected compute region to perform the cryptographic operation, wherein the encrypted cryptographic key is from the plurality of encrypted cryptographic keys and is associated with the selected compute region.

6. The system of claim 5, wherein the preferences indicate an order of compute regions of the plurality of compute regions to use to perform the cryptographic operations.

7. The system of claim 5, wherein the instructions to provide at least the encrypted cryptographic key to the selected compute region to perform the cryptographic operation further include instructions that, as a result of execution by the one or more processors, cause the system to provide the encrypted cryptographic key data structure to the selected compute region.

8. The system of claim 5, wherein the request to perform the cryptographic operation is a request to obtain a plaintext cryptographic key, further wherein the plurality of encrypted cryptographic keys are different ciphertexts of the plaintext cryptographic key.

9. The system of claim 5, wherein the instructions to select the compute region of the plurality of compute regions include instructions that, as a result of execution by the one or more processors, cause the system to determine availability of compute regions of the plurality of compute regions by at least:
- transmitting a plurality of messages to the compute regions of the plurality of compute regions; and
- determining the availability of the compute regions based at least in part on responses to the plurality of messages.

10. The system of claim 5, wherein the instructions further include instructions that, as a result of execution by the one or more processors, cause the system to:
- generate a second request based at least in part on the request, wherein the second request includes an identifier of a managed key from the selected compute region and the encrypted cryptographic key; and
- submit the second request to a cryptography service instance of the selected compute region to cause the cryptography service instance to decrypt the encrypted cryptographic key using the managed key from the selected compute region.

11. The system of claim 10, wherein the encrypted cryptographic key is encrypted with the managed key from the selected compute region.

12. The system of claim 5, wherein the encrypted cryptographic key is provided to a cryptography service instance of the selected compute region.

13. A non-transitory computer-readable storage medium storing thereon executable instructions that, as a result of being executed by one or more processors of a computer system, cause the computer system to:
- submit an application programming interface request to generate a cryptographic key, the application programming interface request comprising:
  - a set of compute regions, at least one compute region in the set of compute regions indicating a geographic location or region; and
  - a set of preferences;
- obtain a response to the application programming interface request that comprises the cryptographic key and a data structure encoding:
  - the set of preferences;
  - a set of encrypted data keys; and
  - a set of bindings that map encrypted data keys of the set of encrypted data keys to corresponding compute regions of the set of compute regions, at least one binding in the set of bindings including information usable to determine an availability of the at least one compute region in the set of compute regions; and
- wherein the data structure is usable, by the computer system, to submit cryptographic requests that can be fulfilled contingent upon at least one of the set of compute regions being available.

14. The non-transitory computer-readable storage medium of claim 13, wherein the instructions further comprise instructions that, as a result of being executed by the one or more processors, cause the computer system to:
- submit a second application programming interface request comprising the data structure; and
- obtain, from a region of the set of compute regions, a second response to the second application programming interface request comprising a plaintext data key.

15. The non-transitory computer-readable storage medium of claim 13, wherein the set of preferences comprise one or more criteria that determine which compute region of the set of compute regions to use to perform cryptographic operations.

16. The non-transitory computer-readable storage medium of claim 15, wherein the one or more criteria comprise at least one of:
- geographical requirements;
- latency requirements; or
- security requirements.

17. The non-transitory computer-readable storage medium of claim 13, wherein the instructions further comprise instructions that, as a result of being executed by the one or more processors of the computer system, cause the computer system to:
- submit a second application programming interface request to update the cryptographic key, the second application programming interface request comprising:
  - an updated set of preferences;
  - an updated set of compute regions; and
  - the data structure; and
- obtain a second response to the second application programming interface request comprising an updated data structure, the updated data structure comprising:
  - the updated set of preferences;
  - an updated set of encrypted data keys; and
  - an updated set of bindings that map encrypted data keys of the updated set of encrypted data keys to corresponding compute regions of the updated set of compute regions.

18. The non-transitory computer-readable storage medium of claim 13, wherein the application programming interface request further comprises an indication of a length of the cryptographic key.

19. The non-transitory computer-readable storage medium of claim 13, wherein the cryptographic requests include requests to obtain the cryptographic key, in plaintext form, from the data structure.

20. The non-transitory computer-readable storage medium of claim 13, wherein the data structure is an opaque data structure.

* * * * *